(12) United States Patent
Lutz et al.

(10) Patent No.: US 8,932,425 B2
(45) Date of Patent: Jan. 13, 2015

(54) METHOD FOR DECORATING SURFACES

(75) Inventors: Norbert Lutz, Ruckersdorf (DE); Walter Kurz, Furth (DE); Ludwig Brehm, Adelsdorf (DE); Hans Peter Bezold, Sulzbach-Rosenberg (DE)

(73) Assignee: Leonhard Kurz Stiftung & Co. KG, Furth (DE)

( * ) Notice: Subject to any disclaimer, the term of this patent is extended or adjusted under 35 U.S.C. 154(b) by 42 days.

(21) Appl. No.: 13/807,170

(22) PCT Filed: Jun. 24, 2011

(86) PCT No.: PCT/EP2011/003126
§ 371 (c)(1),
(2), (4) Date: Mar. 14, 2013

(87) PCT Pub. No.: WO2012/000631
PCT Pub. Date: Jan. 5, 2012

(65) Prior Publication Data
US 2013/0167355 A1    Jul. 4, 2013

(30) Foreign Application Priority Data

Jun. 28, 2010   (DE) .......................... 10 2010 025 278
Oct. 20, 2010   (DE) .......................... 10 2010 048 817

(51) Int. Cl.
*B41M 5/382* (2006.01)
*B41M 5/40* (2006.01)
(Continued)

(52) U.S. Cl.
CPC ............ *B23P 19/04* (2013.01); *B41M 5/38214* (2013.01); *B41M 5/405* (2013.01); *B44C 1/1729* (2013.01); *B44C 1/10* (2013.01); *B41M 2205/42* (2013.01)
USPC ........... 156/234; 156/233; 156/235; 156/239; 156/240; 156/277; 428/32.75; 428/32.76; 428/32.77; 428/32.79; 428/32.81

(58) Field of Classification Search
CPC ............ B41M 5/38214; B41M 5/405; B41M 2205/1729; B41M 2205/17; B44C 1/1729; B44C 1/17

USPC .......... 156/233–235, 239, 240, 277; 428/32.75–32.81, 233–235, 239, 240, 428/277
See application file for complete search history.

(56) References Cited

U.S. PATENT DOCUMENTS 5,827,603 A   10/1998   Suss
6,797,317 B2   9/2004   Ferro
(Continued)

FOREIGN PATENT DOCUMENTS

AU   2003258482   4/2004
CN   1158586   9/1997
(Continued)

*Primary Examiner* — Bruce H Hess
(74) *Attorney, Agent, or Firm* — Hoffmann & Baron, LLP

(57) ABSTRACT

The invention relates to a method and a transfer strip for decorating surfaces, in particular for decorating outer packagings. A transfer strip comprising a strip-like backing film (11), a decorative layer (13) and a release layer (12) arranged between the decorative layer (13) and the backing film is provided. The decorative layer (13) has a multiplicity of identical optically variable decorative elements, which are arranged in first area regions, which are separate from one another and spaced apart from one another in the longitudinal direction of the transfer strip. The decorative layer (13) has second area regions, which are separate from one another and spaced apart from one another in the longitudinal direction of the transfer strip and in which the decorative layer (13) has one or more individualizable layers for providing respectively different machine-readable optical markings. A first area region or a subregion of a first area region and a second area region or a subregion of a second area region of the decorative layer (13) is respectively transferred to a surface to be decorated. The one or more individualizable layers of the respective second area region are individualized before or during the transfer, so that, in addition to one of the optically variable decorative elements, an individualized machine-readable optical marking is transferred from the transfer strip to the surface to be decorated.

32 Claims, 6 Drawing Sheets

(51) Int. Cl.
  *B44C 1/17* (2006.01)
  *B23P 19/04* (2006.01)
  *B44C 1/10* (2006.01)

(56) References Cited

U.S. PATENT DOCUMENTS 6,954,293 B2 10/2005 Heckenkamp et al.

2002/0195499 A1 12/2002 Ferro

FOREIGN PATENT DOCUMENTS

| DE | 4433858 | 5/1996 |
| DE | 29807638 | 9/1998 |
| DE | 10241803 | 3/2004 |
| DE | 60202903 | 6/2005 |
| EP | 1241618 | 9/2002 |
| EP | 1264704 | 12/2002 |
| WO | WO2004041546 | 5/2004 |

254
264

253
263

314

313
323

104
214
224

103
223
213

METHOD FOR DECORATING SURFACES

This application claims priority based on an International Application filed under the Patent Cooperation Treaty, PCT/EP2011/003126, filed on Jun. 24, 2011, and German Application No. DE 102010025278.6-45, filed on Jun. 28, 2010, and German Application No. DE 102010048817.8, filed on Oct. 20, 2010.

BACKGROUND OF THE INVENTION

The invention relates to a method for decorating surfaces, in particular for decorating outer packagings, and also to a transfer strip for decorating surfaces and to a packaging.

It is known to provide outer packagings, for example outer packaging of foods, with a machine-readable optical marking, in particular a barcode. This machine-readable optical marking is usually printed onto the outer packaging by means of offset printing together with a surrounding decoration, which determines the decorative appearance of the outer packaging. On account of the printing processes that are used, which are optimized for high numbers of units, it is not possible in that case to choose the optical machine-readable marking pack-individually. The optical machine-readable marking—in the same way as the decoration—is identical on all the outer packagings produced, and contains product-specific information but not pack-specific information.

SUMMARY OF THE INVENTION

The invention is thus based on the object of making possible an improved decoration of surfaces that also makes it possible furthermore for an individualized machine-readable optical marking to be applied to the surface to be decorated.

This object is achieved by a method for decorating surfaces, in particular for decorating outer packagings, in which a transfer strip comprising a strip-like backing film, a decorative layer and a release layer arranged between the decorative layer and the backing film is provided, the decorative layer having a multiplicity of identical optically variable decorative elements, which are arranged in area regions, which are separate from one another and spaced apart from one another in the longitudinal direction of the transfer strip, and the decorative layer having second area regions, which are separate from one another and spaced apart from one another in the longitudinal direction of the transfer strip and in which the decorative layer has one or more individualizable layers for providing respectively different machine-readable optical markings, in which method a first area region or a subregion of a first area region and a second area region or a subregion of a second area region of the decorative layer is respectively transferred to a surface to be decorated, the one or more individualizable layers of the respective second area region being individualized before or during the transfer, so that, in addition to one of the optically variable decorative elements, an individualized machine-readable optical marking is transferred from the transfer strip to the surface to be decorated. This object is also achieved by a transfer strip for decorating surfaces, in particular for decorating outer packagings, which has a strip-like backing film, a decorative layer and a release layer arranged between the decorative layer and the backing film, the decorative layer having a multiplicity of identical optically variable decorative elements, which are arranged in first area regions, which are separate from one another and spaced apart from one another in the longitudinal direction of the transfer strip, and the decorative layer having second area regions, which are separate from one another and spaced apart from one another in the longitudinal direction of the transfer strip and in which the decorative layer has one or more individualizable layers for providing respectively different machine-readable optical markings. The object is also achieved by a packaging, in particular an outer packaging for cigarettes, which has a backing material, an optically variable decorative element applied to the backing material by means of a transfer strip and an individualized machine-readable optical marking applied to the backing material by means of the same transfer strip. The object is also achieved by a substrate sheet, which has a backing material, an optically variable decorative element applied to the backing material by means of a transfer strip and an individualized machine-readable optical marking applied to the backing material by means of the same transfer strip.

The invention makes it possible to provide a surface to be decorated, for example an outer packaging or substrate sheet, both with a very high-quality and visually attractive decoration and with an individualized machine-readable optical marking in a single working step. In comparison with the approach of applying on the one hand decorations that are complex to produce, and consequently could previously only be produced at low cost by means of industrial-scale processes, and on the other hand individualizing markings to a packaging or substrate sheet in two separate processing steps and in separate processing stations, this therefore has the advantage that the production process is simplified and the reject rate is reduced, so that production is made less expensive. The fact that one and the same transfer strip is used both for the application of an individualized marking and for the application of the optically variable decorative element gives rise to further cost advantages in the production process. Furthermore, it is thus made possible always to position the individualized machine-readable optical marking in exact register in relation to an optically variable decoration, and consequently to avoid the optically variable decorative element applied to the surface disturbing the reading of the machine-readable optical marking in an unforeseeable way.

The surface to be decorated, for example a backing material of a packaging or of a substrate sheet, may additionally have further decorative components, which are in particular printed on before and/or after the application of the optically variable decorative element and the machine-readable optical marking. The surface to be decorated may have opaque and/or translucent and/or transparent area regions or else apertures, it being possible for the optically variable decorative element and/or the machine-readable optical marking to be provided on the front side and/or on the rear side of the surface to be decorated. For example, the surface to be decorated may have an opaque layer of paper or paperboard in which one or more windows or apertures are cut out, in particular punched out, and the one or more windows or apertures being closed, at least on one side of the surface to be decorated, by a transparent or translucent film. The windows or apertures in the surface to be decorated may be configured such that the surface to be decorated consists of a multilayered laminate, in which one or more, in particular opaque, layers are not present to form a window, in particular are cut out, preferably punched out, and one or more further, in particular transparent, layers are not cut out and as a result close the window provided in the other layer. As an alternative to this, the layers forming the surface to be decorated may all be cut through completely, whereby an open window is formed. The optically variable decorative element and/or the machine-readable optical marking may in this case be respectively assigned positionally exactly to the opaque and/or translucent and/or transparent area regions or else respectively only partially overlap with these area regions. The optically variable decorative element may either be arranged on an additional, in particular transparent, layer closing the window or itself close the window as a self-supporting decorative element, which is in particular partially transparent in parts of an area. For example, application on the rear side of the surface to be decorated may be performed in counter print, i.e. mirror-invertedly, in the translucent and/or transparent area regions, in order that the optically variable decorative element and the machine-readable optical marking can be seen right-reading from the front side. The surface to be decorated may in this case serve as a protective layer for the decorative elements, markings or decorative components arranged on the rear side.

This opens up the advantageous possibility of producing the transfer strip with the optically variable decorative element in particular on an industrial scale at one production site and subsequently introducing the individualized machine-readable optical marking into the transfer strip at another production site. At this other production site, the optically variable decorative element and the individualized machine-readable optical marking may be subsequently applied to the backing material. Alternatively, there is of course also the possibility of applying both components, that is to say the optically variable decorative element and the individualized machine-readable optical marking, to the transfer strip at one and the same production site.

Advantageous refinements of the invention are described in the subclaims.

According to a preferred exemplary embodiment of the invention, for individualization, the surface of the decorative layer that is opposite from the release layer is provided in the second area region or in the surface region of the surface to be decorated corresponding to the second area region with a pattern-like adhesive layer. The shaping of the pattern-like adhesive layer corresponds here to the shaping of the individualized machine-readable optical coding. During the transfer, the transfer strip is pressed against the surface to be decorated in the second area region by means of an embossing tool, preferably under the effect of heat to activate the adhesive layer and/or under the effect of high-energy radiation to cure the adhesive layer. In the subregions in which the pattern-like adhesive layer is arranged between the decorative layer and the surface to be decorated, the individualizable layers remain on the surface to be decorated when pulling off takes place. In the other subregions of the second area region, the individualizable layers remain on the transfer strip and are separated from the subregions remaining on the surface to be decorated when pulling off takes place. This procedure is accompanied by the advantage that a wide variety of layers can be used as the individualizable layer and that the individualized optical marking may thus also comprise layers that cannot be applied to a surface to be decorated by means of a printing process.

The transfer strip provided preferably already has here a partial adhesive layer, which has been applied on the surface of the decorative layer that is opposite from the release layer and which is provided in the first area regions but not in the second area regions. Thus, such a partial adhesive layer may be printed onto the surface of the decorative layer that is opposite from the release layer in the first area regions and possibly also further area regions of the transfer strip by means of gravure printing or screen printing, that is to say an industrial-scale process, but in any case the second area regions are not printed with this partial adhesive layer.

The pattern-like adhesive layer is preferably applied by means of inkjet printing or laser printing. For this purpose, a preferably thermally activatable adhesive is brought into solution and printed onto the transfer strip in the second area region by means of an inkjet printer and is then dried. Furthermore, it is possible that a thermally activatable adhesive is printed onto the transfer strip by means of a laser printer and is melted by appropriate thermal treatment, and consequently bonds to the transfer strip in a pattern-like form. A further preferred possibility is that the pattern-like adhesive layer is transferred in the form of a pattern from a transfer film onto the surface of the decorative layer that is opposite from the release layer in the second area region or the surface region of the surface to be decorated corresponding to the second area region by means of a thermal transfer printing head. For this purpose, a layer of a thermally activatable adhesive is applied on the transfer film, is melted by the thermal transfer printing head in a way corresponding to the prescribed pattern and is then transferred to the surface of the transfer strip or the surface to be decorated.

According to a further preferred exemplary embodiment of the invention, the surface of the decorative layer that is opposite from the release layer is provided with an adhesive layer over the full surface area in the second area region. This is preferably performed by means of screen printing or gravure printing. Here it is also possible that the adhesive layer is not only printed onto the transfer strip in the second area regions, but that the transfer strip is printed with the adhesive layer both in the first area regions and in the second area regions or else in further area regions, and is also printed with the adhesive layer over the full surface area. For individualization, a pattern-like deactivation layer is applied to the adhesive layer in the second area region. The shaping of the deactivation layer corresponds here to the shaping of the individualized machine-readable optical marking in a negative form. During the transfer of the transfer strip, the transfer strip is pressed against the surface to be decorated in the second area region by means of an embossing tool. In the subregions in which the pattern-like deactivation layer is not arranged between the adhesive layer and the surface to be decorated, the individualizable layers remain on the surface to be decorated when pulling off takes place. In the other subregions of the second area region, in which the deactivation layer is provided, the individualizable layers remain on the transfer strip, so that these subregions are separated from the subregions remaining on the surface to be decorated when the transfer strip is pulled off from the surface to be decorated.

Used here as the deactivation layer is a layer of a material which prevents adhesive attachment of the transfer strip pressed against the surface to be decorated on the surface to be decorated or, after pressing on, at least has a bonding force which is less than the breaking force of the decorative layer between the area regions with the applied deactivation layer and the area regions without the deactivation layer.

It has proven successful here to use as the deactivation layer a layer which contains in particular radiation-curable silicone acrylates.

The layer thickness of the deactivation layer is in this case preferably between 0.1 μm and 2 μm, more preferably between 0.2 μm and 0.5 μm.

As an alternative or in addition to silicone acrylates, other radiation-curable or radiation-crosslinkable coating constituents with low surface tension in the cured state may be provided. These coating constituents should no longer have thermoplastic properties in the cured or largely completely crosslinked state, in order that they can no longer have any adhering or bonding properties when the transfer strip is pressed on by means of an embossing tool under the effect of heat, and as a result can effectively deactivate the adhering or bonding properties of the adhesive layer.

It has also proven successful furthermore to use a highly pigmented coating layer as the deactivation layer. This coating layer preferably has in the dried state a pigment fraction of over 30 percent by weight, more preferably of 50 percent by weight.

The deactivation layer is preferably applied to the transfer strip by means of an inkjet printer or a laser printer, as already described above with reference to the pattern-like adhesive layer. Furthermore, it is also possible that the deactivation layer is applied to the transfer strip in the form of a pattern from a transfer film by means of a thermal transfer printing head, as has already been described above with reference to the pattern-like adhesive layer.

According to a further preferred exemplary embodiment of the invention, a radiation-activatable or radiation-deactivatable adhesive is applied over the full surface area to the surface of the decorative layer that is opposite from the release layer in the second area region, and thus this surface is provided with a corresponding radiation-activatable or radiation-deactivatable adhesive layer.

A radiation-activatable adhesive layer is understood here as meaning an adhesive layer which only develops an adhesive force between the adjacent surfaces after appropriate irradiation with high-energy radiation, preferably UV radiation, and possibly on the basis of further criteria (temperature, pressure). A radiation-activatable adhesive may be for example a UV-activatable adhesive, which crosslinks under irradiation by means of UV light and thus adhesively bonds the adjacent surfaces to one another. The radiation-activatable adhesive may, however, also be an adhesive that can be activated by heat or pressure, in which the activability by heat or pressure presupposes prior irradiation, for example by means of ITV light. The adhesive may, however, also be what is known as a dualcure adhesive, which can be activated by means of heat, pressure and, at the same time and/or at a time before and/or after, the effect of high-energy radiation.

A radiation-deactivatable adhesive is an adhesive which loses its adhesive force after appropriate irradiation.

For individualization, the adhesive layer in the second area region in the form of a pattern is irradiated in the form of a pattern by a radiation source suitable for activating or deactivating the adhesive layer. The shaping of the irradiated regions corresponds to the shaping of the individualizable machine-readable optical marking or the shaping of the individualizable machine-readable optical marking in a negative form. During the transfer, the transfer strip is pressed against the surface to be decorated in the second area region by means of an embossing tool. In the subregions in which the adhesive layer is activated or not deactivated, the individualizable layers remain on the surface to be decorated when pulling off takes place. In the other subregions of the second area region, the individualizable layers remain on the transfer strip and are separated from the subregions remaining on the surface to be decorated when pulling off takes place.

Thus it is possible for example that a radiation-crosslinkable adhesive is used as the adhesive layer and the adhesive layer is irradiated in the form of a pattern in a positive form, while the transfer strip is pressed against the surface to be decorated in the second area region by means of the embossing tool. In the irradiated regions, the adhesive layer crosslinks and the subregions of the decorative layer lying thereover consequently become adhesively attached to the surface to be decorated. Furthermore, it is also possible that a radiation-curable adhesive layer is applied to the second area regions and is irradiated before the pressing on of the transfer strip by means of the embossing tool in a negative form. In the irradiated regions, the adhesive layer cures and can consequently no longer be activated thereafter to impart an adhesive force between two surfaces. Subsequently, the transfer strip is pressed against the surface to be decorated in the second area regions with the embossing tool and the adhesive layer is thereby also exposed to light over the full surface area to develop an adhesive force, the decorative layer then becoming adhesively attached to the surface to be decorated in the regions in which the adhesive layer is still activatable and has not already been cured by the prior exposure to light.

According to a further preferred exemplary embodiment of the invention, the surface of the decorative layer that is opposite from the release layer is provided with an adhesive layer over the full surface area in the second area region, as already stated above. In the second area region, a radiation-crosslinkable release layer is provided as the release layer. It is also possible here that the release layer is not only radiation-crosslinkable in the second area region, but that the release layer of the transfer strip is also a radiation-crosslinkable release layer over the full surface area. For individualization of the release layer, the release layer is irradiated in the form of a pattern in the second area region by a radiation source suitable for crosslinking the release layer. The shaping of the irradiated subregions of the release layer corresponds to the shaping of the individualized machine-readable optical marking in a negative form. During the transfer, the transfer strip is pressed against the surface to be decorated in the second area region by means of an embossing tool. In the subregions in which the release layer is not irradiated, the individualizable layers remain on the surface to be decorated. In this region, the bonding force imparted by the adhesive layer between the decorative layer and the surface to be decorated is greater than the bonding force imparted by the release layer between the backing film and the decorative layer. In the other subregions of the second area region, in which the release layer is irradiated, the individualizable layers remain on the transfer strip and are thus separated from the subregions of the decorative layer remaining on the surface to be decorated. In this region, depending on the crosslinking of the release layer, the bonding force imparted by the release layer between the backing film and the decorative layer is higher than the bonding force imparted by the adhesive layer between the decorative layer and the surface to be decorated. The bonding forces imparted by the adhesive layer and the release layer are set appropriately to satisfy the conditions described above.

As already stated above, it is possible by means of the methods specified above to use a large number of different layers as the individualized layer.

It is particularly advantageous to configure the decorative layer in the second area regions such that it comprises one or more of the following layers as the individualizable layer: one or more coating layers, which can also be differently colored, a metallic reflective layer, a replicating layer with a molded relief structure, a volume hologram layer, a thin-film layer system, a layer comprising liquid crystals, in particular cholesteric liquid crystals, one or more coating layers containing optically variable pigments, for example thin-film layer pigments or metallic pigments, one or more coating layers comprising fluorescent, luminescent or thermochromic pigments or combinations of the above materials and/or layers.

According to a further preferred exemplary embodiment of the invention, the surface of the decorative layer that is opposite from the release layer is provided with an adhesive layer over the full surface area in the second area region, as already stated above. For individualization, a pattern-like color layer is applied to the adhesive layer in the second area region. The shaping of the color layer corresponds here to the shaping of the individualized machine-readable optical marking. The transparency of the individualizable layer is chosen here such that it is at least 20% higher, preferably at least 70% higher, than the transparency of the color layer is chosen. Preferably, the individualizable layers are chosen here such that the overall transparency thereof is higher than 75%, more preferably of 90%, and the color layer is chosen such that the transparency thereof is lower than 25%, preferably lower than 10%. The individualizable layer may in this case have subregions and/or sublayers with differing transparency or translucence, which together form a decoration that is in particular pattern-like and together have an aforementioned overall transparency, and thereby a corresponding contrast in comparison with the color layer. The corresponding contrast may in this case be in the spectrum of light visible to the human eye in the case of normal light or else under illumination with light outside the visible spectrum, for example UV light or IR light. For this, UV-fluorescent colors may be used for example, in order to create a corresponding contrast. During the transfer, the transfer strip is pressed against the surface to be decorated over the full surface area in the second area region by means of an embossing tool. Subsequently, the transfer strip is pulled off from the surface to be decorated, the transfer layer remaining on the surface to be decorated in the second area region.

Preferably, the breaking force of the individualizable layers is chosen such that the individualizable layers remain on the surface to be decorated in the second area region when the transfer strip is pulled off, in spite of the different bonding forces on the surface to be decorated, on the one hand in the subregions of the second area region provided with the color layer and on the other hand in the subregions of the second area region not provided with the color layer. It is ensured by the appropriate setting of the breaking force of the individualizable layers—also in dependence on the area extent of the applied pattern-like color layer—that no severing of the individualizable layers takes place at the boundary lines between these subregions as a result of the differences in the bonding force between these subregions.

Furthermore, it is also possible to apply a colored adhesive layer to the adhesive layer as the pattern-like color layer.

The pattern-like color layer is applied here to the transfer strip with preference by means of an inkjet printer, by means of a laser printer or else by transfer from a transfer film by means of a thermal transfer printing head, as already described above. The color layer has here with preference a highly contrasting color with respect to the color of the surface to be decorated, with preference the color layer being colored black or a primary color such as red or green or blue.

The layer thickness of the pattern-like color layer is preferably between 0.1 and 20 µm, preferably between 0.2 µm and 5 µm.

The pattern-like color layer or colored adhesive layer that is used as the pattern-like color layer should preferably be chemically similar to the adhesive layer, in order to achieve a good chemical and physical compatibility between the two layers and a uniform bonding of the two layers on the surface to be decorated, and consequently a good resistance of the decoration to external influences. It is advantageous in this case if the adhesive layer and the color layer or colored adhesive layer applied thereon easily mix together with one another at their boundary surfaces. This mixing together may take place depthwise and laterally in the micrometer range and has barely any influence on the edge sharpness or precision.

According to a further preferred exemplary embodiment of the invention, the surface of the decorative layer that is opposite from the release layer is provided with an adhesive layer in the second area region, as already stated above. For individualization, one or more of the individualizable layers are irradiated with high-energy radiation, preferably laser radiation, in the form of a pattern for the ablation of these layers or for achieving a color change in these layers. The shaping of the irradiated subregions of the second area region corresponds here to the shaping of the individualized machine-readable optical markings in a positive or negative form. During the transfer of the transfer strip, the second area region is pressed against the surface to be decorated by means of an embossing tool. The individualizable layers remain on the surface to be decorated when the transfer strip is pulled off. The individualizable layers may be irradiated with the high-energy radiation for individualization before or after the transfer to the surface to be decorated.

The irradiated individualizable layers are preferably selected from the group: metallic layers, color layers that can be bleached by laser and layers that can be induced to undergo a color change by means of a laser. Thus, an irradiated individualizable layer is for example a metal layer of a thickness between 5 and 200 nm, preferably between 20 nm and 100 nm, which under irradiation with a laser is vaporized and thereby removed in the irradiated region, so that this region visually stands out clearly from the surrounding regions. The irradiation with a laser may be performed before or after the application of an adhesive layer. Irradiation with a laser after the application of the adhesive layer is preferred.

In the case of the methods described above, an adhesive layer is more preferably applied to the surface of the decorative layer that is opposite from the release layer over the full surface area at least in the first area regions, preferably at least in the first and second area regions, in particular by means of screen printing or gravure printing. During the transfer, the transfer strip is preferably pressed against the surface to be decorated in a first area region by means of an embossing tool corresponding to the shaping of the decorative element. Subsequently, the transfer strip is pulled off from the surface to be decorated. The decorative element remains here on the surface to be decorated. The regions of the decorative layer that are surrounding the decorative element remain in turn on the transfer strip and are separated from the decorative element when pulling off takes place.

In the methods described above, adhesive layers that can be activated by heat and/or pressure are used with preference as the adhesive layer and/or as the pattern-like adhesive layers. Preferably a heated embossing tool is also used here as the embossing tool, so that the adhesive layers are activated by the pressure imparted by the embossing tool and by the heat imparted by the embossing tool, and consequently the region on which the embossing tool rests is adhesively attached to the surface to be decorated.

It has proven successful that the first area regions are spaced apart from one another with a constant incremental width and that each first area region is assigned a second area region, the second area regions likewise being spaced apart from one another with a constant incremental width and being arranged on the transfer strip in a respectively identical position in relation to the respectively assigned first area region. This ensures an exact-register application of the decorative elements and the individualized machine-readable optical markings and also an effective utilization of the area available on the transfer strip.

Furthermore, it has proven successful that the second area regions have dimensions of between 5×5 mm and 50×50 mm, preferably between 7×7 mm and 20×20 mm. The first area regions have with preference dimensions of between 5×5 mm and 50×50 mm, more preferably between 10×10 mm and 30×30 mm.

According to a preferred variant of the invention, the first and second area regions do not overlap one another. With preference, the first area region is spaced apart here from each second area region by at least 0.5 mm, preferably at least 1 mm, particularly preferably at least 3 mm. This distance is dependent on the process tolerances pertaining during the transfer and also on the size of a possibly required quiet zone enclosing the individualized machine-readable optical markings, in particular two-dimensionally on all sides.

It has proven successful here that, during the transfer, the transfer strip is pressed against the surface to be decorated by means of an embossing tool, which has a first raised embossing area, the shaping of which corresponds to the shaping of the decorative element, and a second raised embossing area, the shaping of which corresponds to the shaping of the second area region. More preferably, before the transfer, the transfer strip is aligned by means of a registration device in such a way with respect to the embossing tool that the first embossing area impinges on the transfer strip in the region of a first area region and the second embossing area impinges on the transfer strip in the region of a further area region. For this purpose, applied on the transfer strip there is preferably a sequence of registering marks, which are sensed by means of a sensor, in particular an optical sensor, of the registration device. On the basis of the position of the registering marks, the registration device correspondingly activates one or more transporting devices, so that the embossing tool impinges on the transfer strip in the way described above.

It is possible that the first area regions correspond exactly in their shaping to the shaping of the decorative elements. However, it has also proven successful that the first area regions are formed over a larger area than the decorative elements and protrude beyond the decorative elements in every direction at least by 1 to 5 mm, more preferably by 1.5 mm. This allows possibly occurring registration inaccuracies to be compensated. If the forming of the first area regions corresponds exactly to the forming of the decorative elements, it is also possible furthermore that the embossing stamp is formed over a slightly larger area than the decorative elements, in order in this way likewise to be able to compensate for registration inaccuracies that possibly occur.

According to a preferred exemplary embodiment of the invention, the decorative layer differs on the one hand in the first area regions and on the other hand in the second area regions. In particular, the decorative layer has on the one hand in the first area regions and on the other hand in the second area regions a different sequence of layers or has different layers there. This makes it possible that the visual impression of the decorative elements differs distinctly from the visual impression of the individualized machine-readable optical marking.

For example, the decorative layer may have in the first area regions a replicating layer with a relief structure molded at least in certain regions and a preferably opaque or largely opaque metallic reflective layer, in particular neighboring the replicating layer, whereas the metallic reflective layer and/or the replicating layer is/are not present in the second area regions. In this case, the decorative layer may have a release layer applied over the full surface area in the first and second area regions and/or an adhesive layer applied over the full surface area. In the second area regions without a metallic reflective layer, the decorative layer may be transparent or translucent, whereby for example a pattern-like color layer applied to the adhesive layer in the second area regions can be identifiable through the decorative layer with sufficient contrast as an individualized machine-readable optical marking. The metallic reflective layer that is not provided in the second area regions may either have been removed from there subsequently, for example by means of etching processes or washing processes, or this region may have been left out when applying the HRI layer, for example by means of a mask.

As an alternative to this, the decorative layer may have in the first area regions a replicating layer with a relief structure molded at least in certain regions and a transparent or largely transparent HRI layer (HRI=High Refraction Index), arranged in particular neighboring the replicating layer as a nonmetallic reflective layer, whereby the decorative layer is largely transparent or translucent in the first area regions. In the second area regions, on the other hand, there is arranged a replicating layer with a relief structure molded at least in certain regions and a preferably opaque or largely opaque metallic reflective layer, in particular neighboring the replicating layer, and as a result the decorative layer is largely opaque in the second area regions, the metallic reflective layer in the second area regions being removed or ablated in the form of a pattern for individualization, in particular by the action of high-energy laser radiation, in order in this way to form a decorative layer that is transparent in the form of a pattern in the second area regions. As an alternative to the replicating layer with an adjacent metallic opaque reflective layer, in the second area regions there may also be arranged an opaque or largely opaque color layer, which is removed or ablated in the form of a pattern, in particular by the action of high-energy laser radiation, in order in this way to form a decorative layer that is transparent in the form of a pattern in the second area regions. The HRI layer that is not provided in the second area regions may either have been removed from there subsequently, for example by means of etching processes or washing processes, or this region may have been left out when applying the HRI layer, for example by means of a mask. The metallic reflective layer or color layer that is not provided in the first area regions may either have been removed from there subsequently, for example by means of etching processes or washing processes, or this region may have been left out when applying the HRI layer, for example by means of a mask.

According to a further preferred exemplary embodiment of the invention, it is also possible that the first and second area regions are arranged overlapping and/or nested in one another. For example, the first area regions may, at least in certain regions, form a frame for the second area regions, the second area regions being arranged entirely or partially within the frame.

The first and second area regions may respectively have a replicating layer with a relief structure molded at least in certain regions and respectively have a preferably semitransparent or opaque or largely opaque, in particular metallic, reflective layer, in particular neighboring the replicating layer. The decorative layer is semitransparent or opaque or largely opaque in the second area regions, the metallic reflective layer being removed or ablated in the second area regions in the form of a pattern for individualization, in particular by the action of high-energy laser radiation, in order in this way to form a decorative layer that is largely transparent in the form of a pattern in the second area regions. The ablation of the reflective layer in the second area regions allows the optically variable effect that is created by the relief structures in the replicating layer to be changed in its visual effect, in particular reduced. The nature and configuration of the relief structures in the first and second regions can be adapted appropriately, in order to optimize the visual appearance of the first and second area regions, because the relief structures are different, in particular are more easily identifiable, on a reflective layer that is largely present than on a reflective layer that has been removed in the form of a pattern. For example, motifs, logos, alphanumeric characters or similar filigree elements for which a reflective layer largely present over the full surface area is necessary for them to be optimally identifiable may be generated by means of relief structures in the first area regions. For example, continuous color gradations or two-dimensional color changing effects or similar two-dimensionally coarsely structured elements for which a reflective layer present only in certain regions is sufficient for them to be easily identifiable may be generated by means of relief structures in the second area regions. Such two-dimensionally coarsely structured elements can facilitate the readability of the individualized optical marking, because disturbing optical effects during reading are possibly reduced. Similarly, it is advantageous to adapt the nature of the relief structures to the best possible readability of the individualized optical marking and to avoid optical effects that disturb readability.

Depending on the reader that is used, it may be advantageous in this respect in particular to use relief structures that are only visible under specific optical conditions (illumination intensity, direction, polarization).

As an alternative or in addition to the replicating layer with a neighboring metallic opaque reflective layer, in the second area regions there may also be arranged an opaque or largely opaque color layer, which is removed or ablated in the form of a pattern, in particular by the action of high-energy laser radiation, in order in this way to form a decorative layer that is transparent in the form of a pattern in the second area regions.

It may be advantageous to form the reflective layer of the individualized optical marking positionally exactly, i.e. in register with the optically variable relief structures.

It is advantageous furthermore if differently formed relief structures form different components of the individualized optical marking and are separately readable. For example, these relief structures differ in their structure parameters such as azimuth angle, spatial frequency, structure depth or correlation length or their form of relief (sawtooth, triangle, rectangle, sine, semicircle, Gaussian bell shape, etc.). Depending on the reader used and/or the illuminating conditions prevailing, parts of the individualized optical marking may be read in particular on the basis of the optical effect of the relief structures, and other parts of the individualized optical marking either form the background or the surroundings for this and/or can be read under different illuminating conditions and/or by a different reader. For example, it is possible as a result to form with the aid of the relief structures an individualized optical marking which can partly be read by a conventional reader, for example a camera with an image processing device. Additionally contained within this individualized optical marking there is further information that cannot be read by the conventional reader and at the same time also does not appear in a disturbing form. Only when there is a change of the illuminating conditions and/or the reader can this second information be read. For example, the illumination intensity, direction or polarization may be changed and/or corresponding changes may be made to the reader, for example fitting a polarizer, a color filter or an additional optical system.

The ablation of the reflective layer may be performed in an advantageous way for example by means of a laser beam, in particular by means of a solid-state laser, for example an Nd:YAG or an Nd:YVO$_4$ laser (Nd=neodymium, Y=ytterbium, V=vanadate, A=aluminum, G=garnet) with a fundamental wavelength ($\lambda$=1064 nm). The fundamental wavelength applied may also be doubled ($\lambda$=532 nm) or tripled ($\lambda$=355 nm). Similarly possible is the use of a fiber laser or a gas laser, for example a $CO_2$ laser, also with different wavelengths. The laser radiation acts on the reflective layer in particular in a pulsed form, the pulses having a length of between 5 ns and 200 ns, preferably between and 20 ns, and pulse repetition frequencies of between 1 and 100 kHz, preferably between 10 and 20 kHz.

The ablation of the reflective layer is performed by a specific surface area of the reflective layer, referred to here as laser pixels, being removed per laser pulse. The smallest edge length or smallest diameter of a laser pixel has a size of between 5 and 500 µm, preferably between 20 and 120 µm.

In the regions in which the first and second area regions are adjacent one another, the replicating layers of the first and/or second area regions are formed with preference as a quiet zone for the individualized optical marking, that is to say as a zone without optically variable effects and without patterns, markings, decorations or other optical markings that possibly hinder the reading operation. For this it is advantageous if, in the quiet zone, the replicating layer has either no relief structures or stochastic matt structures or moth-eye structures, so that the visual appearance in the quiet zone is as uniform as possible and does not have any disturbing patterns, markings or effects. In addition, it is advantageous to remove the reflective layer completely or predominantly in this quiet zone, in order to suppress a possible optically variable effect. Alternatively, a clearance that can serve as a quiet zone may be provided between the first and second area regions, whereby the first and second area regions are spaced apart from one another and are not directly adjacent one another. In this clearance, the replicating layer and/or the reflective layer and/or further layers may be not present or have been left out.

In the overlapping regions of the first and second area regions, the decorative layer may preferably have a full-area or partial HRI layer.

The individualizable machine-readable optical marking preferably consists of a one-dimensional or two-dimensional barcode, for example formed as a matrix code, for example an Aztec code, a QR code (QR=Quick Response), a composite code (combined codes of various kinds) or a color barcode. The one or more individualizable layers are thereby individualized—as described above—in the form of a one-dimensional or two-dimensional barcode. However, it is also possible that sequences of numbers and/or letters are used as the machine-readable optical marking.

A two-dimensional barcode consists of what are known as modules, i.e. individual data points or pixels, which are arranged in a two-dimensional extent (area) and together represent data in a graphically encoded form. A preferred number of modules, harmonizing with international standards, of a two-dimensional barcode (Data Matrix Code ECC200) lies in the range from 10×10 modules (=100 modules) to 144×144 modules (=20736 modules. The maximum number of 144×144 modules can accommodate up to 3116 numbers or 2335 ASCII characters, altogether 1558 bytes. A two-dimensional barcode is intended to contain at least 10×10 modules. A QR code contains between 21×21 and 177×177 modules. In addition, a QR code contains special functional patterns for the alignment and positioning of the reader. The modules contain the data in a redundant form, so that the encoded data can still be decoded even if part of the code is illegible, for example has been destroyed or is covered. A QR code may contain in addition to the modules and the functional patterns also further graphic motifs that are in particular unencoded or encoded in some other way, for example letters, numerals, symbols, logos, a halftone image, a multicolored image, in particular provided with digital watermarks, a barcode, a numeric code, etc., it being possible for these graphic motifs to be arranged within the area region of the QR code. For example, a logo may be provided approximately centrally in the QR code, modules and functional patterns preferably enclosing the logo on all sides. The area extent of a two-dimensional barcode depends on the number of modules and the area extent of an individual module. The area extent of an individual module depends in turn on the resolving power or the reading capabilities of the readers or decoding devices that are used. These may be for example special barcode scanners, but also cellphones or other electronic devices, in particular mobile electronic devices, that are equipped with a camera and preferably a network connection and/or decoding software for barcodes. It has proven successful in practice if an individual module has a smallest extent in one direction of from 0.1 mm to 1 mm, preferably from 0.3 mm to 0.75 mm. This module size can be detected within allowed tolerances by most readers or decoding devices. In the case of a module size of 0.5 mm and a number of modules of 21×21, an area extent of the two-dimensional barcode of 10.5×10.5 mm is obtained. In the case of a module size of 0.75 mm and a number of modules of 12×12, an area extent of the two-dimensional barcode of 9×9 mm is obtained. With 12×12=144 modules, 10-place codes can be represented, whereby it is possible to generate $10^{10}$ different codes, and consequently $10^{10}$ different barcodes. In two-dimensional terms, preferably provided neighboring a two-dimensional barcode, preferably enclosing it on all sides, there is what is known as a quiet zone. In this quiet zone there should not be any patterns, markings, decorations or other optical markings that possibly hinder the reading operation. With preference, the quiet zone is at least equivalent to a module width/module length, for example of between 0.1 mm and 5 mm, preferably between 0.1 mm and 2 mm. For applications with average to strong optical "noise", i.e. optical disturbing effects of the surroundings, in the direct proximity of the symbol, a minimum quiet zone of 2 to 4 module widths/module lengths is recommended, for example between 0.5 mm and 5 mm. It is consequently dependent on the module size. For a barcode reading operation that is as dependable and disturbance-free as possible, it is advantageous if the barcode has as high a contrast as possible. With preference, the contrast should be at least 20%, in particular at least 70%. The percentage values are intended to represent the difference between the reflectivity or absorptivity of the modules in comparison with a background.

The ablation of the reflective layer of a module is preferably performed by means of a number of laser pulses. Each laser pulse removes the reflective layer with a surface area of a laser pixel. In this case, preferably a number of laser pixels form a module, an area overlap of neighboring laser pixels being provided with preference, for example an overlap of between 0 and 80%, preferably an overlap of between 10% and 50%, in order to achieve complete removal of the reflective layer and avoid remains of reflective layer between neighboring laser pixels. However, it is also possible that one laser pixel alone forms a module, that is to say that a single, sufficiently strong laser pulse creates a module. The smaller a laser pixel is, the lower the required laser power or laser pulse energy for ablating the reflective layer in the area region of the laser pixel. The more laser pixels that form a module, the more exactly the outer contour of the module can be created, and the better the legibility of the code comprising a number of modules, preferably neighboring modules. The more laser pixels form a module, the longer the ablation of an entire module takes. If a single laser pixel forms a module, the beam shaping optics and/or beam shaping mechanisms of the laser determine how exactly the outer contour of the laser pixel, and consequently the outer contour of the module, is formed. Depending on the kind of code and the kind of later legibility, the exactness of the modules thereby created is sufficient.

For example, in the case of a laser pixel size of 40 µm×40 µm, a module size of 500 µm×500 µm and an overlap of neighboring laser pixels of 25%, 16.67×16.67=277.8 laser pixels form a module. In the case of a laser pixel size of 80 µm×80 µm, a module size of 500 µm×500 µm and an overlap of neighboring laser pixels of 25%, 8.33×8.33=69.4 laser pixels form a module. If the pulse repetition frequency is for example 10 kHz, i.e. a laser pulse takes place every 100 µs=0.0001 s, the ablation of a module with a module size of 500 µm×500 µm comprising 277.8 laser pixels with 25% overlap of the laser pixels takes approximately 0.0278 s or a module with a module size of 500 µm×500 µm comprising 69.4 laser pixels with 25% overlap of the laser pixels takes approximately 0.00694 s. In the case of a code with a module size of 500 µm×500 µm, 277.8 laser pixels per module and 21×21 modules, of which on average approximately 50%=220 modules have to be removed, the ablation of a code, that is to say the removal of 220 modules, with 25% overlap of the laser pixels and with a pulse repetition frequency of 10 kHz takes approximately 6.1 s. In the case of a code with a module size of 500 µm×500 µm, 69.4 laser pixels per module and 21×21 modules, of which approximately 50%=220 modules have to be removed, the ablation of a code with 25% overlap of the laser pixels and with a pulse repetition frequency of 10 kHz takes approximately 1.5 s.

According to a preferred exemplary embodiment of the invention, the decorative layer respectively comprises in the first area regions with the optically variable decorative elements one or more optically active layers, which show different image information and/or different colors by interference and/or diffraction of the incident light in dependence on the angle of incidence of the incident light and/or the viewing direction. With preference, the decorative layer respectively has in the first area regions with the optically variable decorative elements a replicating layer with a relief structure molded in a surface of the replicating layer, in particular comprising a diffractive relief structure, a relief structure of a hologram, a macrostructure and/or a lens structure, a volume hologram layer with a volume hologram, a thin-film layer system and/or a layer comprising cholesteric liquid crystals. More preferably, these layers are also combined with a reflective layer, for example a metallic layer or an HRI layer, a coating layer and/or a layer containing optically variable pigments or luminescent or thermochromic pigments.

It is also advantageous furthermore that each of the optically variable decorative elements contains hidden information, which can be made visible by means of a verifying element. Thus, the optically variable decorative element may for example contain a special hologram, the information of which can only be made visible by means of a monochromatic light source, for example a laser pointer, as a verifying element. The verifying element may also be a polarization filter or an optical lens or an optical lens array.

BRIEF DESCRIPTION OF THE DRAWINGS

The invention is explained by way of example below on the basis of several exemplary embodiments with the aid of the accompanying drawings.

DETAILED DESCRIPTION OF THE INVENTION

Figure 1:
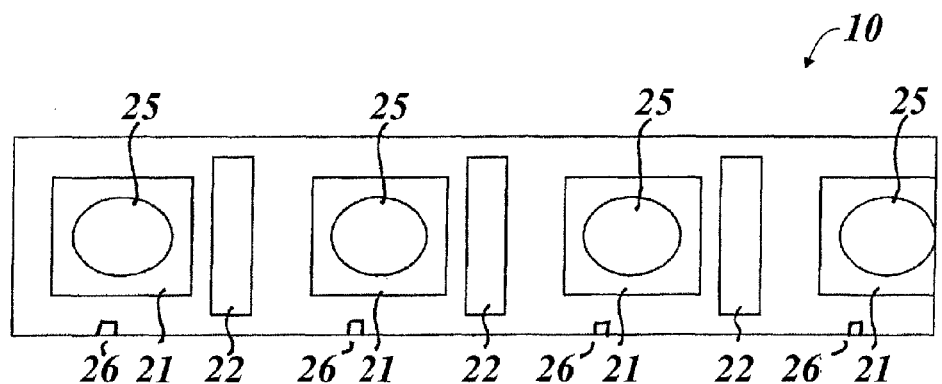
FIG. 1 shows a schematic representation of a plan view of a detail of a transfer strip.
Figure 2:
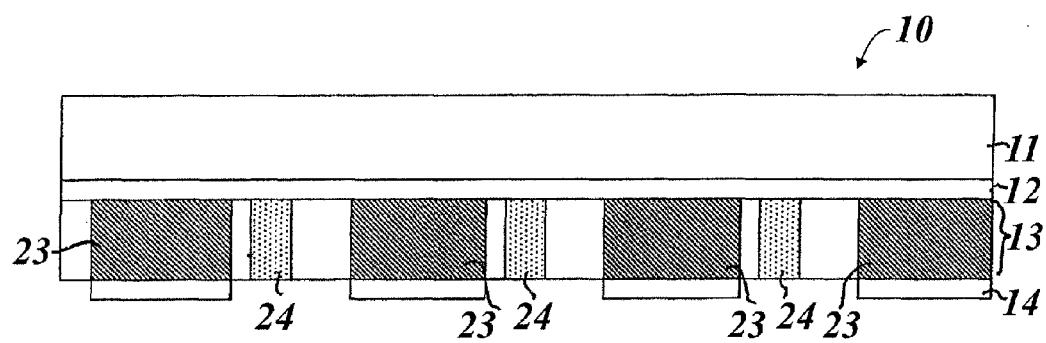
FIG. 2 shows a schematic representation of a sectional image of the transfer strip as shown in FIG. 1.

FIG. 1 and FIG. 2 show a detail from a transfer strip 10 with a number of area regions 21 and 22 and register marks 26. The transfer strip 10 has a strip-like shaping with a width preferably in the range from 5 mm to 50 mm, preferably from 15 mm to 30 mm, and a length which is preferably greater than the width of the transfer strip 10 by a factor of 500.

The transfer strip 10 has a strip-like backing film 11, a release layer 12, a decorative layer 13 and a partial adhesive layer 14.

The backing film 11 is preferably a film of plastic with a layer thickness of between 6 and 200 µm, more preferably between 12 and 36 µm. With preference, the backing film consists of PET, BOPP, PVC, PC or PP.

With preference, the release layer 12 has wax components, which have the effect that, when heated, in particular during a hot embossing operation, the bonding force imparted by the release layer between the backing film 11 and the decorative layer 13 is reduced, and thus the release of the decorative layer from the backing film is facilitated.

The decorative layer 13 consists of one or more layers. The decorative layer 13 has here one or more optically active, in particular optically variable, layers. Optically variable may mean in this connection that the visually perceptible impression of the layer varies in dependence on the illuminating situation and/or the viewing angle. The visual perception may in this case take place with the unaided eye or with the aid of polarizers, magnifying or reducing optics or other aids. These optically active layers may be formed here by one or more of the following layers:

The decorative layer 13 may have a replicating layer with a relief structure molded over the full surface area or in certain regions. The replicating layer preferably has here a layer thickness of between 0.1 and 5 µm, preferably between 0.2 µm and 2 µm, and consists of a thermoplastic or UV-curable replicating coating. By means of an embossing stamp, a relief structure provided on the embossing stamp is molded into this replicating layer by the use of heat and pressure or under UV irradiation. This relief structure is an optically active relief structure. The relief structure may be formed for example by a diffractive relief structure, the spatial frequency of which is between 100 lines/mm and 3600 lines/mm. Furthermore, it may also be a holographic body structure, for example the relief structure of a 2D/3D hologram. Furthermore, it may also be the relief structure of a kinoform or a Fourier hologram, which may possibly also include hidden information that can only be made visible by means of irradiating with monochromatic light, for example a laser pointer. Furthermore, it is also possible that the relief structure has regions in which the relief structure is formed as a macrostructure, matt structure or as a lens-like structure, for example forms a microlens array. Various of the aforementioned relief structures may also be molded in the replicating layer in different regions of the decorative layer, in order in this way to generate different optically variable information in different regions.

Furthermore, in the decorative layer there may also be provided as an optically active layer a reflective layer, for example a metallic layer with a layer thickness of between 10 and 100 nm, more preferably between 20 and 50 nm, and/or one or more HRI or LRI layers (HRI=High Refraction Index, LRI=Low Refraction Index) with a layer thickness of between 60 and 120 nm, for example a layer of ZnS or ZnO or $TiO_2$, $ZrO_2$ as the HRI layer or for example $SiO_x$, $SiO_2$ or $MgF_2$ as the LRI layer.

Furthermore, in the decorative layer there may also be provided as an optically active layer a volume hologram layer, which has for example a layer thickness of between 10 and 30 µm and in which a volume hologram is recorded. Here, too, it is possible that different volume holograms are recorded in different regions of the volume hologram layer.

Furthermore, in the decorative layer there may also be provided as an optically active layer a layer comprising a microlens array (spherical lenses and/or lenticular-cylindrical lenses) in combination with a layer lying thereunder with microimage information, which combination has for example a layer thickness of between 10 and 100 µm.

Furthermore, in the decorative layer there may also be provided as an optically active layer one or a combination of the following layers: a thin-film layer system, a color coating layer, a layer containing optically variable pigments, for example thin-film layer pigments, metal pigments or liquid crystal pigments, a layer containing oriented liquid crystals, a layer containing luminescent or thermochromic pigments or mixtures of such pigments. A thin-film layer system consists here of a sequence of layers with a spacer layer, which satisfies the λ-quarter and λ-half condition for a light wavelength λ, in the range of visible light, and thus shows viewing-angle-dependent color shift effects. Such a layer system is in this case preferably three-layered, consisting of an absorption layer, the spacer layer described above and a reflective layer.

In addition to the optically active layers, the decorative layer 13 preferably also has one or more further layers, in particular one or more protective layers and/or adhesion promoting layers.

The decorative layer 13 is preferably differently configured in the area regions 21 on the one hand and the area regions 22 on the other hand, and also differently configured in turn in the area regions surrounding the area regions 21 and 22. Thus, for example, the decorative layer 13 respectively forms in the area regions 21 a multilayered body 23 and in the area regions 22 a multilayered body 24, the multilayered body 23 differing from the multilayered body 24. The multilayered bodies 23 and 24 may differ here in the number and kind of optically active layers provided there and the information encoded in these layers, for example in that, although there is a replicating layer or a volume hologram layer in each of the multilayered bodies 23 and 24, different relief structures are molded or different volume holograms are recorded in the multilayered bodies 23 on the one hand and the multilayered bodies 24 on the other hand. Thus it is possible that the multilayered bodies 23 on the one hand and the multilayered bodies 24 on the other hand have a different combination of the optically active layers cited above, or the multilayered body 23 or the multilayered body 24 also has additional optically active layers of those described above in comparison with the multilayered body 24 or the multilayered body 23, respectively.

Thus, for example, both the multilayered body 23 and the multilayered body 24 may contain a metallic reflective layer, but the multilayered body 23 may also additionally contain furthermore a replicating layer with a molded hologram. Furthermore, it is also possible that the multilayered bodies 24 likewise have a replicating layer, but no optically active surface structure is molded in it. Furthermore, it is possible that the multilayered body 24 does not have a metal layer, but instead of that has a layer with luminescent pigments or a thin-film layer system that is not provided in the multilayered body 23.

Furthermore, it is also possible that the multilayered body 24 has in addition to or instead of the optically active layer cited above also one or more layers selected from the group comprising layers that can be ablated by laser, color layers that can be bleached by laser, and layers that can be induced to undergo a color change by means of laser irradiation.

The layers in the multilayered body 24 are configured furthermore as individualizable layers, which—as described below—are individualized before or during the transfer of these layers to a surface to be decorated, in order to form an individualized machine-readable optical marking. Thus, for example, the breaking force of this layer is chosen such that, in the method described below, it is only in individualized subregions that it is transferred to the surface to be decorated, and consequently individualized. Furthermore, it is possible for example that these layers are chosen such that they can be changed in their optical properties by means of a laser before or during the transfer, to form individualized information, or be transparent appropriately to allow them to be individualized by the printing on of a color layer.

As shown in FIG. 1, the area regions 21 respectively have furthermore an optically variable decorative element 25. This decorative element 25 may comprise here—as shown in FIG. 1—merely a subregion of the area region 21 or else comprise the entire area region of the area region 21.

Consequently, the decorative element respectively comprises one of the multilayered bodies 23 or a subregion of one of the multilayered bodies 23. The multilayered bodies 23 are chosen here such that the decorative elements 25 are identical. The decorative elements 25 consequently have the same layer structure and the same sequence of layers and the information that is possibly encoded in the layer of the multilayered bodies 23, for example in the form of a relief structure or a recorded volume hologram, is identical, so that all of the decorative elements 25 convey the same optically variable information to the viewer. Minor modifications of the information, within the production tolerance of the production processes that are used, are of course possible.

As shown in FIG. 2, applied to the decorative layer 13 in the area regions 21 is an adhesive layer 14. The adhesive layer 14 is an adhesive layer with a layer thickness of between 0.5 and 5 μm, preferably between 1 μm and 2 μm. The adhesive layer 14 consists here of a thermally activatable adhesive. However, it is also possible that an adhesive that can be activated by pressure or an adhesive that can be activated by means of UV radiation is used as the adhesive for the adhesive layer 14. In the case of a preferred exemplary embodiment of the invention, which is explained below on the basis of the figures FIG. 3 to FIG. 5, although the adhesive layer 14 is applied in the area regions 21—as shown in FIG. 2—it is not applied in the area regions 22. In the case of this embodiment too, it is possible that the adhesive layer 14 is also provided in further area regions of the transfer strip 10 that cannot be assigned to the area regions 21 and 22.

With preference, the adhesive layer 14 is printed onto the decorative layer 13 by means of an industrial-scale process, for example by means of gravure printing or screen printing, during the production of the transfer strip 10.

Before the decoration of the target substrate, a pattern-like adhesive layer 15, the shaping of which corresponds to the shaping of the individualized machine-readable optical marking, is thus in each case printed on in the area regions 22. The machine-readable optical markings preferably consist here respectively of a one-dimensional or two-dimensional barcode. Thus, they are for example respectively printed onto the successive area regions 22 with a differing adhesive pattern, which respectively corresponds to the shaping of a different one-dimensional or two-dimensional barcode.

With preference, the adhesive layer 15 is printed on here by means of an inkjet printer. For this purpose, a registration device senses the register marks 26 and activates an inkjet printing head in such a way that it prints onto the respective area region 22 the pattern of the respectively assigned one- or two-dimensional barcode.

Used here as a print medium to be printed is a print medium which contains a solution containing an adhesive that can be activated by heat and/or pressure and/or radiation.

Furthermore, it is also possible—as already described above—that the adhesive layer 15 is applied to the decorative layer 13 by means of a laser printing unit or by means of a thermal transfer print with the aid of a transfer film.

Figure 4:
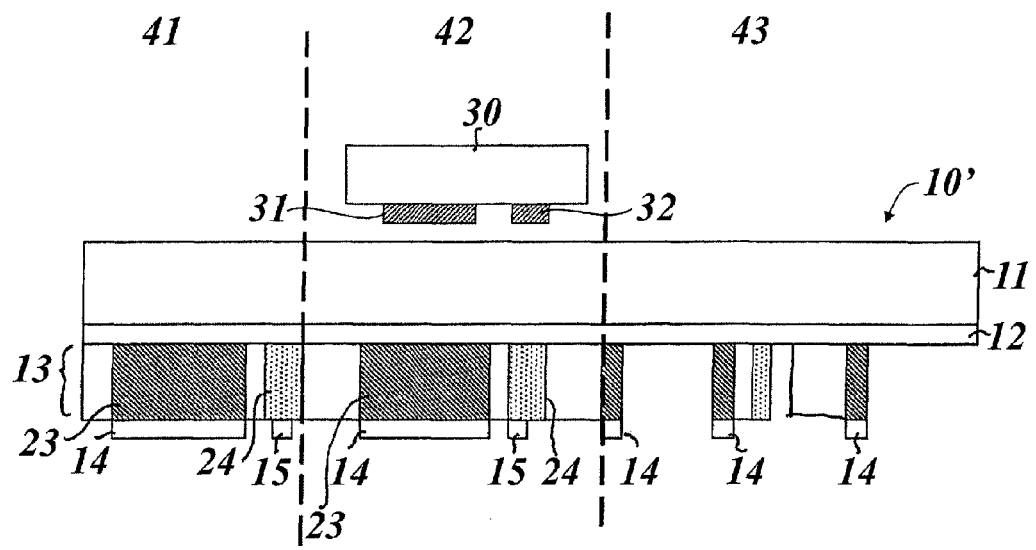
FIG. 4 shows a schematic representation of a transfer strip in various processing phases.

The transfer strip 10' provided in this way with the additional adhesive layer 15 is then fed to an embossing unit, by means of which the decorative elements 25 and the individualized machine-readable optical markings are transferred to the surface to be decorated. FIG. 4 thus shows by way of example a detail of the transfer strip 10' respectively in a phase 41 before transferring the decorative element 25 and the individualized machine-readable optical markings, a phase 42 during the transfer of the decorative element 25 and the individualized machine-readable optical markings and a phase 43 after transferring the decorative element 25 and the individualized machine-readable optical markings.

Figure 3:
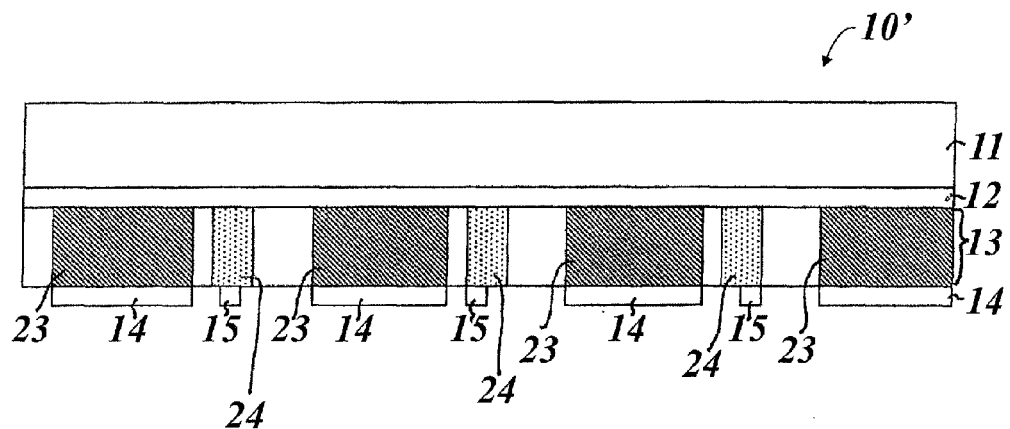
FIG. 3 shows a schematic representation of a sectional image of the transfer strip as shown in FIG. 2 after carrying out the processing step.

In the phase 41, the transfer strip 10' is still constructed as shown in FIG. 3. In the phase 42, an embossing tool 30 is pressed onto the transfer strip 10' from the side of the backing film 11, so that the transfer strip 10' is pressed against the surface to be decorated, which is not shown in FIG. 4. As shown in FIG. 4, the embossing tool 30 has a raised embossing area 31 and a raised embossing area 32. The raised embossing area 31 is formed here in the form of the decorative element 25, i.e. the outlines of the embossing area 31 correspond to the outlines of the decorative element 25. The embossing area 32 is formed in the form of the area regions 22. The embossing areas 31 and 32 are arranged spaced apart from one another on the embossing tool 30 in such a way that the embossing area 32 impinges congruently on an area region 22 of the transfer strip 10' and the embossing area 31 impinges on the transfer strip 10' within an assigned area region 21 of the transfer strip 10'. The embossing tool 30 is preferably a heated embossing tool.

The pressure exerted on the transfer strip by the embossing areas 31 and 32 has the effect that the transfer film 10' is pressed against the surface to be decorated in the region of the embossing areas 31 and 32. The pressure generated hereby and/or the heat transferred from the embossing areas 31 and 32 to the transfer strip 10' then activates the adhesive layers 14 and 15 in the area regions of the transfer strip 10' in which the embossing areas 31 and 32 lie.

Figure 5:
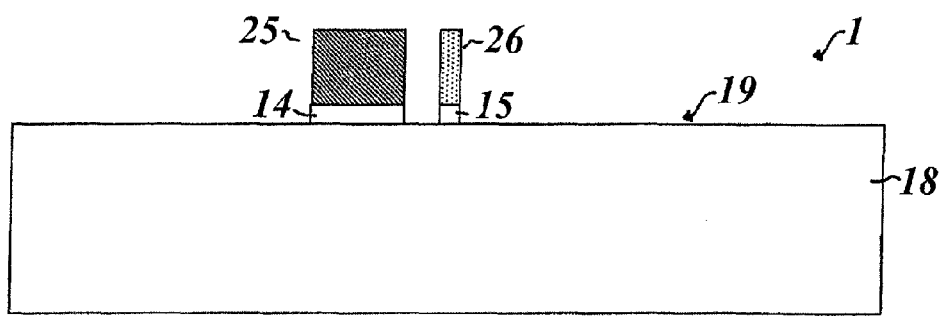
FIG. 5 shows a schematic sectional representation with a decorated surface.

Thus, for example, FIG. 5 shows a backing material 18 of a substrate sheet or an outer packaging, for example an outer packaging for cigarettes. The backing material 18 consists here for example of a paper backing, which is possibly also coated with one or more coating layers or layers of plastic. On the surface 19 of the backing material 18 there is then adhesively attached by the process described above a decorative element 25 and, in the subregions of an area region 22 that are covered by the adhesive layer 15, a subregion of the multilayered body 24 that is structured in the form of an individualized machine-readable optical marking and thus forms an individualized machine-readable optical marking 26.

After activation of the adhesive layers 14 and 15, as described above, the backing strip 10' is pulled off from the surface to be decorated. The bonding force of the adhesive layers 14 and 15 between the decorative layer 13 on the one hand and the surface 19 to be decorated on the other hand, the bonding force imparted by the release layer 12 between the decorative layer 13 on the one hand and the backing film 11 on the other hand and the breaking force of the layers of the decorative layer 13 are set here such that, in regions of the adhesive layer 15 and in the region in which the adhesive layer 14 has been activated, as described above by the embossing area 31, the decorative layer remains on the surface 19 to be decorated and, in the other regions, the decorative layer remains on the transfer strip 10', and these subregions are separated from one another when pulling off takes place.

After pulling off of the backing strip 10', consequently the regions of the decorative layer 13 that are shown in FIG. 4 in the phase 43 remain on the backing strip 10'. The subregions of the decorative layer 13 of the transfer strip 10' that are shown in FIG. 5 have been transferred onto the surface 19 to be decorated. The outer packaging 1 consequently has on the backing material 18 a decorative element 25, which consists of a region of a multilayered body 23 that is formed in the shaping of the decorative element and the layer structure of which consequently corresponds to the layer structure of the multilayered bodies 23. Furthermore, for this purpose there is applied in exact register an individualized machine-readable optical marking 26, the layer structure of which corresponds to the layer structure of the multilayered bodies 24.

Figure 6:
FIG. 6 shows a representation of a detail from a transfer strip, the forming of the embossing stamps used during the transfer and a transferred decorative element and a transferred, individualized, machine-readable optical marking for a first embodiment.
Figure 6:
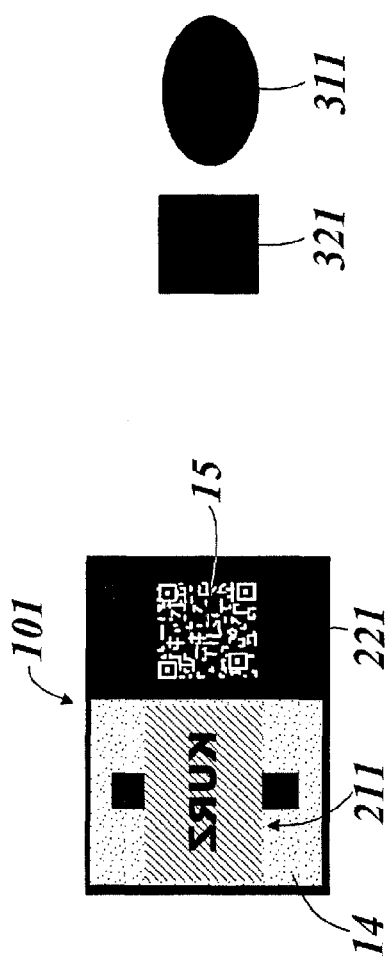

FIG. 6 shows by way of example a corresponding configuration of a detail 101 from a transfer strip 10'.

The detail 101 has an area region 211 and an area region 221. The area region 211 corresponds to the area region 21 and the area region 221 corresponds to the area region 22. In the area region 211, the decorative layer 13 as a multilayered body 23 has as optically active layers a replicating layer with a molded holographic relief structure and a metallic reflective layer of aluminum adjacent the replicating layer. Furthermore, printed on in the area region 211 is a full-area adhesive layer 14, which covers at least the region of the replicating layer with the molded holographic relief structure. Provided as an optically active layer in the area region 221 is a full-area metallic reflective layer. In the area region 221 there is—as indicated by light coloring—in the form of pattern the adhesive layer 15, printed on in the form of a two-dimensional barcode. The embossing areas 31 and 32 that are used for the transfer are configured like the embossing areas 311 and 321, respectively, as shown in FIG. 6. The transferred decorative element is formed in plan view like the decorative element 251 as shown in FIG. 6 and the transferred individualized machine-readable optical marking is formed like the optical marking 261 with the metallic reflective layer formed in a way corresponding to the pattern-like adhesive layer 15, as shown in FIG. 6.

Figure 7:
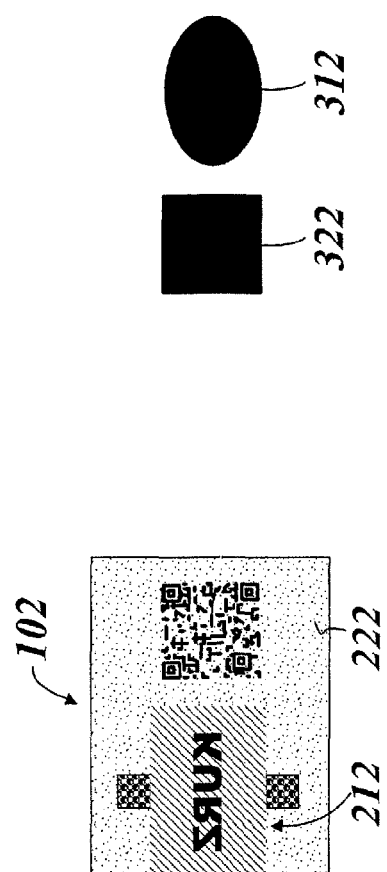
FIG. 7 shows a representation of a detail from a transfer strip, the forming of the embossing stamps used during the transfer and a transferred decorative element and a transferred, individualized, machine-readable optical marking for a further embodiment.

A further exemplary embodiment of the invention is now explained hereafter on the basis of FIG. 7.

In the case of this exemplary embodiment, the transfer strip 10 produced according to the figures FIG. 1 and FIG. 2 is provided with the adhesive layer 14 not only in the area regions 21, but likewise in the area regions 22. With respect to the structure of the layers of the transfer strip 10 and the configuration thereof, reference is made to the statements made above in relation to FIG. 1 and FIG. 2.

For individualization, a deactivation layer is then applied in the form of a pattern to the adhesive layer in the respective area regions 22, the shaping of the deactivation layer corresponding to the shaping of the individualized machine-readable optical marking in a negative form. The deactivation layer is applied here by means of the methods already described above with respect to FIG. 3, that is to say in particular by means of inkjet printing, by means of a laser printer or by means of a thermal transfer printing head from a transfer film. The deactivation layer preferably has here a layer thickness of from 0.1 µm to 2 µm.

Suitable for a deactivation layer that can be printed by means of an inkjet printer are silicone acrylates, combined with a binder, it being intended that both components, and possibly further auxiliaries, are radiation-curing, in order that they can no longer have any adhering or bonding properties when the transfer strip is pressed on by means of an embossing tool under the effect of heat, and as a result can effectively deactivate the adhering or bonding properties of the adhesive layer.

The transfer of the decorative element 25 and the individualized machine-readable optical marking 26 is then performed in the same way as presented above on the basis of the figures FIG. 4 and FIG. 5, apart from that the adhesive layer 14 is likewise provided in the area regions 22 and the deactivation layer is not provided in the area regions in which the adhesive layer 15 has been applied, as shown in FIG. 4, and the deactivation layer is provided in the subregions of the area region 22 in which the adhesive layer 15 is not provided, as shown in FIG. 4. Thus, reference is made to the relevant statements made above in relation to FIG. 4 and FIG. 5.

FIG. 7 thus shows an exemplary embodiment of a portion 102 of a transfer strip 10 individualized in the way described above by means of a deactivation layer, the forming of the assigned embossing areas 312 and 322, and also of the transferred decorative element 252 and the transferred individualized machine-readable optical marking 262.

The area regions 21 are formed like the area regions 212 and the area regions 22 are formed like the area regions 222. As shown in FIG. 7, the transfer strip has been coated with an adhesive layer over the full surface area and a deactivation layer (indicated in dark color) has been printed on in the area region 222 in a negative form. After transfer by means of an embossing tool with the embossing areas 312 and 322, the decorated surface has the decorative element 252 and also the individualized machine-readable optical marking 262.

As an alternative to this, it is also possible to dispense with the printing on of the deactivation layer in a negative form and, instead of that—as already stated above—a radiation-activatable or radiation-deactivatable adhesive layer may be applied in the area regions 22 or the release layer 12 may be formed as a radiation-crosslinkable release layer at least in the area regions 22. Otherwise, the transfer strip is constructed as already explained above on the basis of the figures FIG. 1 and FIG. 2. As already stated above, after that the adhesive layer is exposed to light in the regions 22 in the form of a pattern in a positive or negative form of the individualized machine-readable optical coding. A UV-crosslinkable adhesive is preferably used here as the adhesive and the irradiation is preferably performed by means of a corresponding UV laser.

As an alternative or in addition, it is possible, as already stated above, to provide a radiation-crosslinkable release layer and to expose this release layer to light in a negative form of the respective individualized machine-readable optical coding.

It is also possible here that a radiation-crosslinkable release layer and a radiation-crosslinkable adhesive layer are exposed to light at the same time by means of one and the same exposure operation, and the edge sharpness of the transferred individualized machine-readable optical marking is thereby further improved.

According to a further embodiment, the transfer strip 10 is coated with the adhesive layer 14 not only in the area regions 21 but in the area regions 22, and a pattern-like color layer, the shaping of which corresponds to the shaping of the individualized machine-readable optical marking, is respectively applied subsequently in the area regions 22. The structure of the transfer strip corresponds to the structure already described on the basis of the figures FIG. 1 and FIG. 2 and reference is made to the relevant statements pertaining to FIG. 1 and FIG. 2. The transfer of a decorative element 25 and a respective individualized machine-readable optical marking to the surface to be decorated is performed as already described above on the basis of the figures FIG. 4 and FIG. 5, with the difference that the decorative layer is transferred over the full surface area in the area region 22. Furthermore, it is also possible to combine this method with one or more of the methods already described above.

Figure 9:
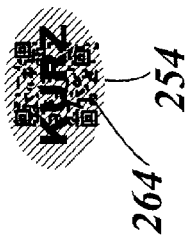
FIG. 9 shows a representation of a detail from a transfer strip, the forming of the embossing stamps used during the transfer and a transferred decorative element and a transferred, individualized, machine-readable optical marking for a further embodiment.
Figure 9:
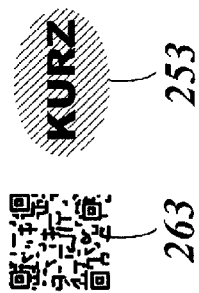
Figure 9:
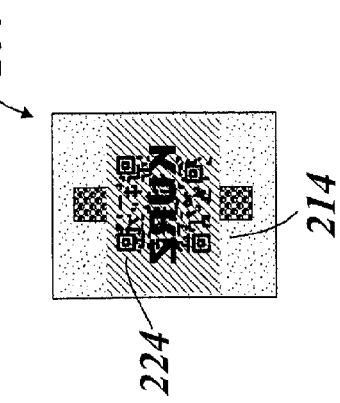

A particularly preferred embodiment of this variant is now explained on the basis of FIG. 9. FIG. 9 firstly shows a detail 104 of a transfer strip, an embossing area 314, a decorative element 254 and an individualized machine-readable optical marking 264.

In the case of the embodiment as shown in FIG. 9, the area regions 22 of the transfer strip 10 are not arranged separately and spaced apart from the area regions 21, as shown in FIG. 1, but instead the area regions 21 and 22 overlap one another. The area regions are arranged in relation to one another like the area region 214 and the area regions 22 are arranged in relation to one another like the area region 224 as shown in FIG. 9, so that the area regions 22 respectively form a subregion of the area regions 21. In the case of the exemplary embodiment as shown in FIG. 9, in the area region 214 the multilayer body 23 has a replicating layer with a molded relief structure of a hologram and also a full-area HRI layer. The transparency of these two layers is chosen here such that an overall transparency of more than 75% is obtained. In the area region 214, which is assigned to the individualizable machine-readable optical marking, there is in the form of a pattern a color layer printed on in the form of a two-dimensional barcode, as is shown in FIG. 9. The color layer is printed on by means of an inkjet printer, laser printer or by means of a thermal transfer printing head. Preferably a color coating, in particular a black-colored color coating, is used. The use of the transparent or translucent HRI layer makes possible an overlapping arrangement of the machine-readable optical marking and the decorative element. In this case it is expedient if a color that gives a contrast of at least 20%, preferably at least 70%, in comparison with the color of the backing material 18 is chosen for the color coating. The percentage values are intended to represent the difference between the reflectivity or absorptivity of the modules in comparison with a background.

It is of course also possible, as stated above for example in the case of the exemplary embodiments as shown in FIGS. 6 and 7, to transfer the decorative element and the individualized machine-readable optical marking to the surface to be decorated in area regions that are separate from one another. The use of an HRI layer or other at least partly transparent layers generating optically variable effects in the multilayered body 24 makes it possible here to provide the individualized optically variable marking also with additional, optically variable effects.

According to a further embodiment, the multilayered body 24 comprises—as already mentioned above—one or more layers that can be changed in their optical properties by means of radiation. In the case of this embodiment, the transfer strip 10 is provided with the adhesive layer 14 not only in the area regions 21 but also in the area regions 22, and for individualization these layers are exposed to light in the area regions 22 respectively in the form of a pattern according to the shaping of the respective individualized machine-readable optical marking.

The transfer strip 10 is constructed here as already described above on the basis of the figures FIG. 1 and FIG. 2 and reference is made to the relevant statements. The multilayered body 24 has furthermore with preference—possibly also in addition to the layers cited above—a layer that can be ablated by radiation, for example a metal layer of a layer thickness of between 20 and 60 nm, a color layer that can be bleached by laser, with preference of a layer thickness of between 0.1 and 1 µm, and/or layer that can be induced to undergo a color change by means of irradiation. The color layer that can be bleached by laser and/or the layer that can be induced to undergo a color change by means of irradiation preferably has corresponding pigments that can be bleached by laser and/or pigments that can be induced to undergo a color change by means of irradiation.

In a particularly preferred embodiment, the color layer that can be bleached by laser and/or the layer that can be induced to undergo a color change by means of irradiation is formed by the adhesive layer 14. As a result, a simpler and thinner layer structure of the transfer strip 10 is possible.

The color layer that can be bleached by laser is a coating layer colored by pigments or other coloring agents, of a thickness of preferably 2 to 10 µm. The pigments or other color-imparting systems or coloring agents of this color coating layer can be selectively bleached and/or can be changed in color by a color change with the aid of a laser beam, the wavelength of which preferably lies in the visible range. The pigment concentration of this coating layer preferably lies between 1% and 25%, preferably 3% and 15% for pigments that can be bleached by laser and preferably 5% and 20% for pigments that can be induced to undergo a color change by means of irradiation, with respect to the solid body of the coating layer. There should preferably always be approximately a constant amount of pigment contained in the coating layer, in order to be able to create a high-contrast optical marking. For this purpose, it is advantageous if the pigment concentration is chosen in dependence on the layer thickness of the coating layer, this relationship being approximately inversely proportional. In other words, if the coating layer is reduced to approximately half, the pigment concentration must be approximately doubled, and vice versa. The binder system of this coating layer must not be optically changed by the action of the lasers, so that only a colored contrast marking is produced at the irradiated locations, without any identifiable damage to the film. The film does not appear to be damaged either on the surface or inside.

It has proven successful here to use as the color layer that can be bleached by radiation a color layer that can be bleached by laser, for example with the following formulation:

| | |
|---|---|
| Methyl ethyl ketone | 34.0 parts |
| Toluene | 26.0 parts |
| Ethyl acetate | 13.0 parts |
| Cellulose nitrate (low-viscosity, 65% in alcohol) | 20.0 parts |
| Linear polyurethane (flash point >200° C.) | 3.5 parts |
| High-molecular weight dispersing additive (40%, amine value 20) | 2.0 parts |
| e.g.: Pigment Blue 15:4 | 0.5 part |
| Pigment Red 57:1 | 0.5 part |
| Pigment Yellow 155 | 0.5 part |

Pigment Blue 15:4 is a pigment with a color of cyan or blue, Pigment Red 57:1 is a pigment with a color of red or magenta, Pigment Yellow 155 is a pigment with a color of yellow or orange. If all three pigments are used together, a black layer is obtained, in which for example a green individualized machine-readable optical marking can be created by means of a pulsed green laser. If only a single pigment is used, a cyan/blue, magenta/red or yellow-colored layer is obtained, a layer that can be bleached completely by means of the suitable laser, even to the extent of being transparent.

It has also proven successful to use as the layer that can be induced to undergo a color change by means of radiation a layer with the following formulation:

| | |
|---|---|
| Methyl ethyl ketone | 34.0 parts |
| Toluene | 26.0 parts |
| Ethyl acetate | 13.0 parts |
| Cellulose nitrate (low-viscosity, 65% in alcohol) | 20.0 parts |
| Linear polyurethane (flash point >200° C.) | 3.5 parts |
| High-molecular weight dispersing additive (40%, amine value 20) | 2.0 parts |
| e.g.: LP Red S31A (yellow → red) | 0.5 part |
| LP Violet VG354 (magenta → violet) | 0.5 part |

Pigment LP Red S31A is a pigment which exhibits a color change from yellow to red under irradiation. LP Violet VG354 is a pigment which exhibits a color change from magenta or pink to violet under irradiation. "LP" stands here for "Latent Pigment".

For individualization, the aforementioned layers are preferably irradiated in the form of a pattern by means of a laser. The color layer that can be bleached by laser and/or the layer that can be induced to undergo a color change by means of irradiation may be arranged at different layer positions within the layer structure of the multilayered body 24, depending on which layers of it are substantially transparent or translucent and which are substantially opaque, which side of the multilayered body 24 is intended as the visible side or viewing side and which overlaps, at least in certain regions, between the individual layers are desired.

This individualizing method may also be used in combination with the individualizing methods described above.

Figure 8:
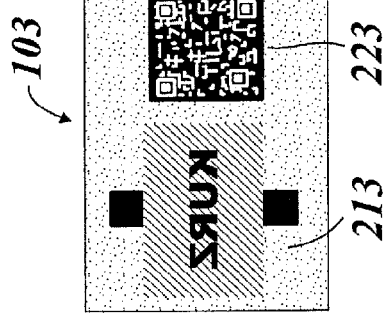
FIG. 8 shows a representation of a detail from a transfer strip, the forming of the embossing stamps used during the transfer and a transferred decorative element and a transferred, individualized, machine-readable optical marking for a further embodiment.
Figure 10:
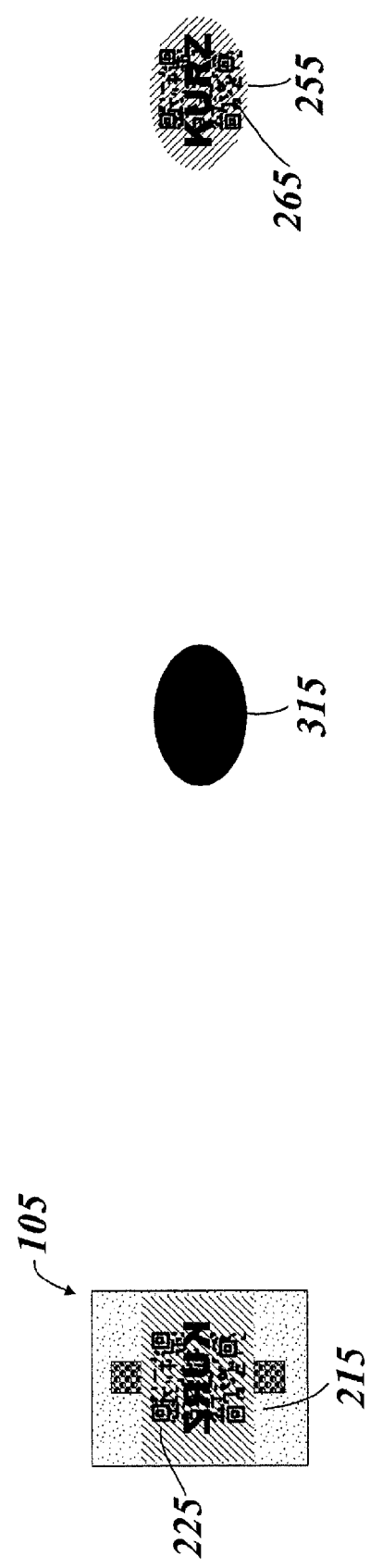
FIG. 10 shows a representation of a detail from a transfer strip, the forming of the embossing stamps used during the transfer and a transferred decorative element and a transferred, individualized, machine-readable optical marking for a further embodiment.

FIG. 8 and FIG. 10 show two variants of this exemplary embodiment:

FIG. 8 shows a portion 103 of the transfer strip 10 with an area region 213 and an area region 223, two embossing areas 313 and 323, an individualized machine-readable optical marking 263 and a decorative element 253.

The transfer strip 10 is formed in the area regions 21 as in the area region 213 as shown in FIG. 8 and is formed in the area regions 22 as per the area region 223 as shown in FIG. 8. In the area region 213, a replicating layer with a molded relief structure of a hologram and a partial metallic reflective layer are provided. As stated above, there may of course also be optically active layers provided in the assigned multilayered body 23. In the area regions 223, a full-area metal layer, preferably a full-area aluminum layer, of a layer thickness of between 20 and 60 nm is provided. By means of a laser, the metal layer in the area region 223 is then exposed to light in a negative form of a barcode, to be precise with an exposure intensity and an exposure duration such that the metal layer vaporizes in the exposed regions. Consequently, the metallic regions represented in a dark color in FIG. 8 remain in the area region 223. After transfer according to FIG. 4 and FIG. 5 when using an embossing tool 30 with the embossing areas 313 and 323 as embossing areas 31 and 32, the arrangement shown in FIG. 8 of the decorative element 253 remains on the surface 19 to be decorated in addition to the individualized machine-readable optical marking 263.

FIG. 10 shows a portion 105 of the transfer strip 10 with the area regions 215 and 225, an embossing area 315 and also a decorative element 255 and an individualized machine-readable optical marking 265.

The area regions 21 of the transfer strip 10 are formed like the area regions 215 and the area regions 22 of the transfer strip 10 are formed like the area regions 225 as shown in FIG. 10. In the case of this embodiment, the area regions 215 and 225 are arranged overlapping. The multilayered bodies 24 have as optically active layers a black coating layer, a replicating coating layer with a molded holographic or diffractive relief structure and a metallic reflective layer. The regions of the area region 215 surrounding the area region 225 likewise have these layers, but not the black color coating layer.

By means of a laser, the area region 225 is then exposed to light in a negative form of a two-dimensional barcode. The exposure intensity and the pigments of the black color layer are chosen here such that the exposure to light by means of the laser has the effect that the pigments are bleached to the extent that they become transparent, so that the black color layer in the exposed regions becomes transparent and the black, opaque color effect only remains in the regions that are not exposed. Subsequently, the transfer to the surface to be decorated of the decorative element and the machine-readable optical marking individualized as described above is performed as already explained above on the basis of the figures FIG. 4 and FIG. 5. Here, the embossing area of the embossing tool 30 is formed like the embossing area 315 as shown in FIG. 10. After transfer, the arrangement shown in FIG. 10 of the decorative element 255 and the individualized machine-readable coding 265 is obtained.

Figure 11:
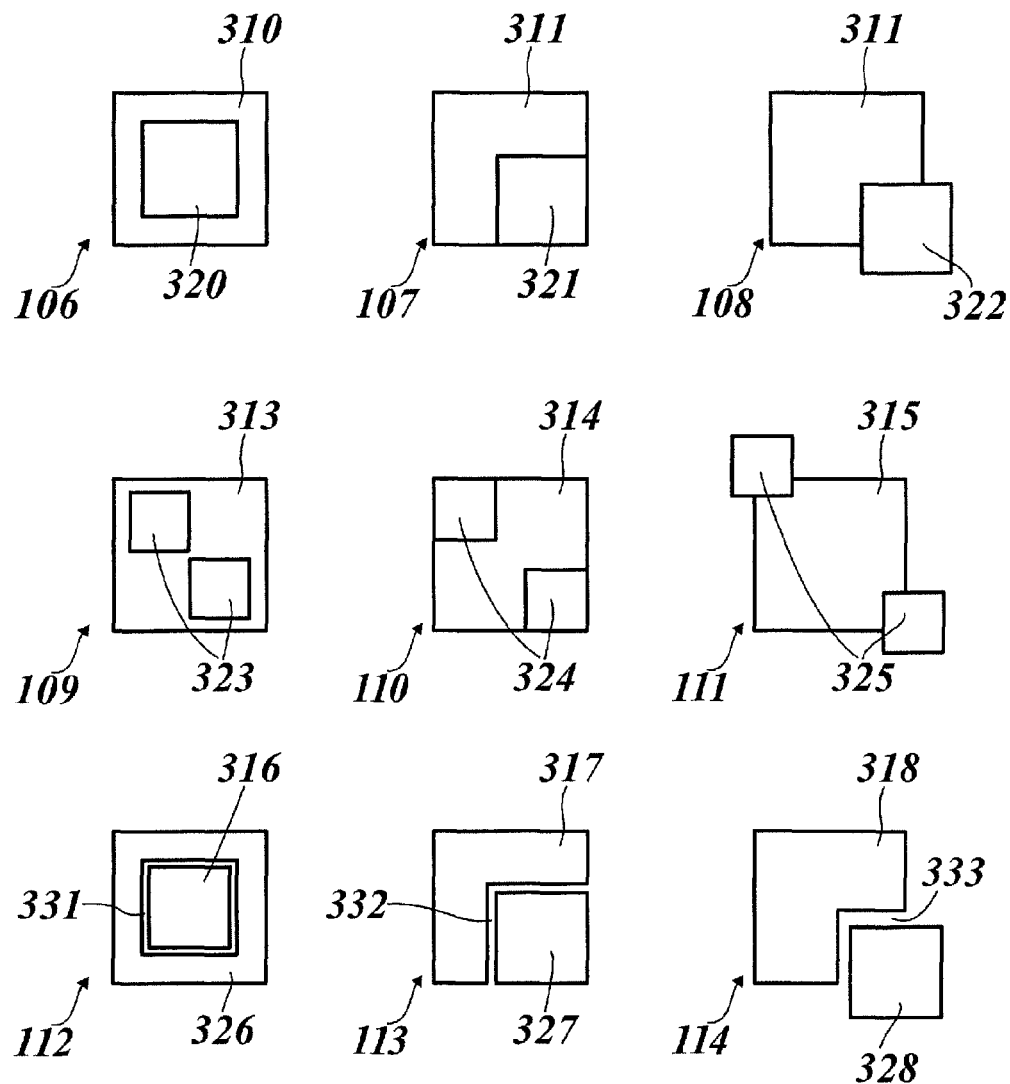
FIG. 11 shows a schematic plan view of various embodiments of first and second area regions, which are arranged overlapping or nested in one another.

FIG. 11 shows various portions 106 to 114 of various transfer films 10, which have different arrangements of first and second area, regions.

The portion 106 has an arrangement in which a first area region 310 forms a peripheral, closed frame for a second area region 320 arranged within the frame.

Portion 107 has an arrangement in which a first area region 311 forms an open frame enclosing a second area region 321 only on two outer sides. The first area region and the second area region thereby form a common rectangular outer contour, the edge length of the first area region 311 defining the overall edge length of the two area regions. That is to say that the second area region 321 is arranged within the contours of the first area region 311.

The portion 108 has an arrangement in which a first area region 312 forms an open frame enclosing a second area region 322 only on two outer sides. The common outer contour of the first area region and the second area region is not rectangular; rather, the second area region 332 protrudes out from the imaginary rectangle contour of the first area region 312 or partially overlaps the rectangular contour of the first area region 312 with the rectangular contour of the second area region 322.

The portion 109 has an arrangement of a first area region 313 and two second area regions 323, which are arranged in a way similar to the portion 106 within the outer contour of the first area region 313. The first area region 313 thereby forms a frame and/or a background for the second area regions 323.

The portion 110 has an arrangement in which a first area region 314 encloses the second area regions 324 only in certain regions, similar to the portion 107. That is to say that the second area regions 324 are arranged within the contours of the first area region 314.

The portion 111 has an arrangement similar to that of the portion 108 with two second area regions 325. The second area regions 325 protrude out from the imaginary rectangular contour of the first area region 315 or partially overlap the rectangular contour of the first area region 315 with the respectively rectangular contours of the second area region 325.

The portions 112 to 114 correspond to the arrangements according to the portions 106 to 108, with the difference that the respective first and second area regions 316 to 318 and 326 to 328 are not directly adjacent one another, but that a quiet zone 331 to 333 is respectively arranged between them as a clearance. The clearance may in particular be provided as a quiet zone for a machine-readable code in the first and/or second area region 316 to 318 or 326 to 328. The width and/or length of the quiet zones 331 to 333 may in this case be adapted to the requirements of the respective machine-readable code and is preferably between 0.1 mm and 5 mm.

The basic arrangements according to the portions 106 to 114 are also conceivable with differently shaped first and second area regions, for example with round, oval, triangular, polygonal or irregularly shaped first and second area regions.

Optically variable effects may be assigned either to the first area region or the second area region, in particular positionally exactly, i.e. arranged in register with the first or second area region. Optically variable effects may, however, also extend continuously without interruption over the first and second area regions. It is similarly possible for there to be combinations of optically variable effects which in certain regions are assigned to the first or second area region and in certain regions extend continuously without interruption over the first and second area regions.

The invention claimed is:

1. A method for decorating outer packagings, the method comprising:
providing a transfer strip comprising a strip-like backing film, a decorative layer and a release layer arranged between the decorative layer and the backing film, the decorative layer having a multiplicity of identical optically variable decorative elements, which are arranged in first area regions, which are separate from one another and spaced apart from one another in the longitudinal direction of the transfer strip, and the decorative layer having second area regions, which are separate from one another and spaced apart from one another in the longitudinal direction of the transfer strip and in which the decorative layer has one or more individualizable layers for providing respectively different machine-readable optical markings; and
respectively transferring a first area region or a subregion of a first area region and a second area region or a subregion of a second area region of the decorative layer to a surface to be decorated, the one or more individualizable layers of the respective second area region being individualized before or during the transfer, so that, in addition to one of the optically variable decorative elements, an individualized machine-readable optical marking is transferred from the transfer strip to the surface to be decorated,
wherein different relief structures are molded in the replicating layer of the decorative layer in the first area regions on the one hand and in the second area regions on the other hand.

2. The method as claimed in claim 1, wherein the one or more individualizable layers for forming a one-dimensional barcode and/or a two-dimensional barcode are individualized as an individualized machine-readable optical marking.

3. The method as claimed in claim 1, wherein the decorative layer respectively comprises in the first area regions and/or in the second area regions one or more optically active layers, which show different image information and/or different colors by interference and/or diffraction of the incident light in dependence on the angle of incidence of the incident light and/or the viewing direction.

4. The method as claimed in claim 1, wherein the decorative layer respectively has in the first area regions and/or the second area regions a replicating layer with a relief structure molded in a surface of the replicating layer, at least in certain regions, comprising a diffractive relief structure, a relief structure of a hologram, a macrostructure and/or a lens structure, a volume hologram layer with a volume hologram, a thin-film layer system and/or a layer comprising cholesteric liquid crystals.

5. The method as claimed in claim 1, wherein each of the optically variable decorative elements contains hidden information, which can be made visible by means of a verifying element.

6. The method as claimed in claim 1, wherein the decorative layer in the second area regions respectively comprises a colored coating layer, a metallic reflective layer, a replicating layer with a molded relief structure, a volume hologram layer, a thin-film layer system and/or a layer comprising liquid crystals.

7. The method as claimed in claim 1, wherein the first area regions are spaced apart from one another with a constant incremental width, wherein each of the first area regions is assigned a second area region, and wherein the second area regions are spaced apart from one another with a constant incremental width and are arranged on the transfer strip in a respectively identical position in relation to the respectively assigned first area region.

8. The method as claimed in claim 1, wherein the second area regions have dimensions of between 5×5 mm and 50×50 mm.

9. The method as claimed in claim 1, wherein the first and second area regions do not overlap one another and, each first area region is spaced apart from each second area region by at least 1 mm.

10. The method as claimed in claim 1, wherein the decorative layer differs on the one hand in the first area regions and on the other hand in the second area regions has a different sequence of layers and/or has different layers.

11. The method as claimed in claim 1, wherein, during the transfer, the transfer strip is pressed against the surface to be decorated by means of an embossing tool, which has a first raised embossing area, the shaping of which corresponds to the shaping of the decorative element, and a second raised embossing area, the shaping of which corresponds to the shaping of the second area region, and wherein, before the transfer, the transfer strip is aligned by means of a registration device in such a way with respect to the embossing tool that the first embossing area impinges on the transfer strip in the region of a first area region and the second embossing area impinges on the transfer strip in the region of a second area region.

12. The method as claimed in claim 1, wherein, for individualization, the surface of the decorative layer that is opposite from the release layer is provided in the second area region or in the surface region of the surface to be decorated corresponding to the second area region with a pattern-like adhesive layer, the shaping of the pattern-like adhesive layer corresponding to the shaping of the individualized machine-readable optical marking, wherein, during the transfer, the transfer strip is pressed against the surface to be decorated in the second area region by means of an embossing tool, wherein, in the subregions in which the pattern-like adhesive layer is arranged between the decorative layer and the surface to be decorated, the individualizable layers remain on the surface to be decorated when pulling off takes place and, in the other subregions of the second area region, the individualizable layers remain on the transfer strip and are separated from the subregions remaining on the surface to be decorated when pulling off takes place.

13. The method as claimed in claim 12, wherein the transfer strip provided has a partial adhesive layer, which has been applied on the surface of the decorative layer that is opposite from the release layer, and wherein the partial adhesive layer is provided in the first area regions but not in the second area regions.

14. The method as claimed in claim 12, wherein a partial adhesive layer is printed onto the surface of the decorative layer that is opposite from the release layer by means of gravure printing or screen printing in such a way that the partial adhesive layer is provided in the first area regions, but not in the second area regions.

15. The method as claimed in claim 12, wherein the pattern-like adhesive layer is printed on by means of inkjet printing or laser printing or the pattern-like adhesive layer is transferred in the form of a pattern from a transfer film onto the surface of the decorative layer that is opposite from the release layer in the second area region or the surface region of the surface to be decorated corresponding to the second area region by means of a thermal transfer printing head.

16. A method for decorating outer packagings, the method comprising:
providing a transfer strip comprising a strip-like backing film, a decorative layer and a release layer arranged between the decorative layer and the backing film, the decorative layer having a multiplicity of identical optically variable decorative elements, which are arranged in first area regions, which are separate from one another and spaced apart from one another in the longitudinal direction of the transfer strip, and the decorative layer having second area regions, which are separate from one another and spaced apart from one another in the longitudinal direction of the transfer strip and in which the decorative layer has one or more individualizable layers for providing respectively different machine-readable optical markings; and
respectively transferring a first area region or a subregion of a first area region and a second area region or a subregion of a second area region of the decorative layer to a surface to be decorated, the one or more individualizable layers of the respective second area region being individualized before or during the transfer, so that, in addition to one of the optically variable decorative elements, an individualized machine-readable optical marking is transferred from the transfer strip to the surface to be decorated,
wherein the surface of the decorative layer that is opposite from the release layer is provided with an adhesive layer over the full surface area in the second area region, and
wherein, for individualization, a pattern-like deactivation layer is applied to the adhesive layer in the second area region, the shaping of the deactivation layer corresponding to the shaping of the individualized machine-readable optical marking in a negative form, and
wherein, during the transfer, the transfer strip is pressed against the surface to be decorated in the second area region by means of an embossing tool, and
wherein, in the subregions in which the pattern-like deactivation layer is not arranged between the adhesive layer and the surface to be decorated, the individualizable layers remain on the surface to be decorated when pulling off takes place, and in the other subregions of the second area region, in which the deactivation layer is provided, the individualizable layers remain on the transfer strip and are separated from the subregions remaining on the surface to be decorated when pulling off takes place.

17. The method as claimed in claim 16, wherein the deactivation layer contains silicones and/or consists of a highly pigmented coating.

18. A method for decorating outer packagings, the method comprising:
providing a transfer strip comprising a strip-like backing film, a decorative layer and a release layer arranged between the decorative layer and the backing film, the decorative layer having a multiplicity of identical optically variable decorative elements, which are arranged in first area regions, which are separate from one another and spaced apart from one another in the longitudinal direction of the transfer strip, and the decorative layer having second area regions, which are separate from one another and spaced apart from one another in the longitudinal direction of the transfer strip and in which the decorative layer has one or more individualizable layers for providing respectively different machine-readable optical markings; and
respectively transferring a first area region or a subregion of a first area region and a second area region or a subregion of a second area region of the decorative layer to a surface to be decorated, the one or more individualizable layers of the respective second area region being individualized before or during the transfer, so that, in addition to one of the optically variable decorative elements, an individualized machine-readable optical marking is transferred from the transfer strip to the surface to be decorated, wherein the surface of the decorative layer that is opposite from the release layer is provided with a radiation-activatable or radiation-deactivatable adhesive layer over the full surface area in the second area region, wherein, for individualization, the adhesive layer in the second area region in the form of a pattern is irradiated in the form of a pattern by a radiation source suitable for activating or deactivating the adhesive layer, the shaping of the irradiated regions corresponding to the shaping of the individualized machine-readable optical marking or the shaping of the individualized machine-readable optical marking in a negative form, wherein, during the transfer, the transfer strip is pressed against the surface to be decorated in the second area region by means of an embossing tool, wherein, in the subregions in which the adhesive layer is activated or not deactivated, the individualizable layers remain on the surface to be decorated when pulling off takes place, and, in the other subregions of the second area region, the individualizable layers remain on the transfer strip and are separated from the subregions remaining on the surface to be decorated when pulling off takes place.

19. A The method for decorating outer packagings, the method comprising:

providing a transfer strip comprising a strip-like backing film, a decorative layer and a release layer arranged between the decorative layer and the backing film, the decorative layer having a multiplicity of identical optically variable decorative elements, which are arranged in first area regions, which are separate from one another and spaced apart from one another in the longitudinal direction of the transfer strip, and the decorative layer having second area regions, which are separate from one another and spaced apart from one another in the longitudinal direction of the transfer strip and in which the decorative layer has one or more individualizable layers for providing respectively different machine-readable optical markings; and respectively transferring a first area region or a subregion of a first area region and a second area region or a subregion of a second area region of the decorative layer to a surface to be decorated, the one or more individualizable layers of the respective second area region being individualized before or during the transfer, so that, in addition to one of the optically variable decorative elements, an individualized machine-readable optical marking is transferred from the transfer strip to the surface to be decorated, wherein the surface of the decorative layer that is opposite from the release layer is provided with an adhesive layer over the full surface area in the second area region, wherein, in the second area region, a radiation-crosslinkable release layer is provided as the release layer, wherein, for individualization, the release layer is irradiated in the form of a pattern in the second area region by a radiation source suitable for crosslinking the release layer, the shaping of the irradiated subregions corresponding to the shaping of the individualized machine-readable optical marking in a negative form, wherein, during the transfer, the transfer strip is pressed against the surface to be decorated in the second area region by means of an embossing tool, wherein, in the subregions in which the release layer is not irradiated, the individualizable layers remain on the surface to be decorated when pulling off takes place and, in the other subregions of the second area region, in which the release layer is irradiated, the individualizable layers remain on the transfer strip and are separated from the subregions remaining on the surface to be decorated when pulling off takes place.

20. The method as claimed in claim 19, wherein the individualizable layers comprise a full-area metal layer.

21. A method for decorating outer packagings, the method comprising:

providing a transfer strip comprising a strip-like backing film, a decorative layer and a release layer arranged between the decorative layer and the backing film, the decorative layer having a multiplicity of identical optically variable decorative elements, which are arranged in first area regions, which are separate from one another and spaced apart from one another in the longitudinal direction of the transfer strip, and the decorative layer having second area regions, which are separate from one another and spaced apart from one another in the longitudinal direction of the transfer strip and in which the decorative layer has one or more individualizable layers for providing respectively different machine-readable optical markings; and respectively transferring a first area region or a subregion of a first area region and a second area region or a subregion of a second area region of the decorative layer to a surface to be decorated, the one or more individualizable layers of the respective second area region being individualized before or during the transfer, so that, in addition to one of the optically variable decorative elements, an individualized machine-readable optical marking is transferred from the transfer strip to the surface to be decorated, wherein the surface of the decorative layer that is opposite from the release layer is provided with an adhesive layer over the full surface area in the second area region, wherein, for individualization, a pattern-like color layer is applied to the adhesive layer in the second area region, the shaping of the color layer corresponding to the shaping of the individualized machine-readable optical marking and the transparency of the individualizable layers being chosen to be at least 20%, higher than the transparency of the color layer, wherein, during the transfer, the transfer strip is pressed against the surface to be decorated over the full surface area in the second area region by means of an embossing tool and then the transfer strip is pulled off from the surface to be decorated.

22. The method as claimed in claim 21, wherein the breaking force of the individualizable layers is chosen such that the individualizable layers remain on the surface to be decorated in the second area region when the transfer strip is pulled off, or wherein a colored adhesive layer is applied to the adhesive layer as the pattern-like color layer.

23. A method for decorating outer packagings, the method comprising:

providing a transfer strip comprising a strip-like backing film, a decorative layer and a release layer arranged between the decorative layer and the backing film, the decorative layer having a multiplicity of identical optically variable decorative elements, which are arranged in first area regions, which are separate from one another and spaced apart from one another in the longitudinal direction of the transfer strip, and the decorative layer having second area regions, which are separate from one another and spaced apart from one another in the longitudinal direction of the transfer strip and in which the decorative layer has one or more individualizable layers for providing respectively different machine-readable optical markings; and respectively transferring a first area region or a subregion of a first area region and a second area region or a subregion of a second area region of the decorative layer to a surface to be decorated, the one or more individualizable layers of the respective second area region being individualized before or during the transfer, so that, in addition to one of the optically variable decorative elements, an individualized machine-readable optical marking is transferred from the transfer strip to the surface to be decorated, wherein the surface of the decorative layer that is opposite from the release layer is provided with an adhesive layer in the second area region, wherein, for individualization, one or more individualizable layers are irradiated in the form of a pattern for the ablation of these layers or for achieving a color change in these layers, the shaping of the irradiated subregions corresponding to the shaping of the individualized machine-readable optical marking or the shaping of the individualized machine-readable optical marking in a negative form, wherein, during the transfer, the transfer strip is pressed against the surface to be decorated over the full surface area in the second area region by means of an embossing tool, and wherein the individualizable layers in the second area region remain on the surface to be decorated when the transfer strip is pulled off.

24. The method as claimed in claim 23, wherein the irradiated individualizable layers are selected from the group: metallic layers, color layers that can be bleached by laser and layers that can be induced to undergo a color change by means of laser irradiation.

25. The method as claimed in claim 23, wherein the one or more individualizable layers comprise an opaque metal layer or an opaque coating layer, which is made by the irradiation to become transparent in the irradiated subregion by the ablation thereof.

26. The method as claimed in claim 23, wherein a replicating layer with a relief structure molded at least in certain regions is provided in the second area regions, wherein one or more of the individualizable layers form a reflective layer intensifying the optical effect of the relief structure, and wherein the irradiation has the effect that these one or more individualizable layers are reduced in their reflectivity in the irradiated subregions by the ablation thereof, and so the optical effect of the relief structure is reduced in its visual effect in the irradiated subregions.

27. A method for decorating outer packagings, the method comprising:

providing a transfer strip comprising a strip-like backing film, a decorative layer and a release layer arranged between the decorative layer and the backing film, the decorative layer having a multiplicity of identical optically variable decorative elements, which are arranged in first area regions, which are separate from one another and spaced apart from one another in the longitudinal direction of the transfer strip, and the decorative layer having second area regions, which are separate from one another and spaced apart from one another in the longitudinal direction of the transfer strip and in which the decorative layer has one or more individualizable layers for providing respectively different machine-readable optical markings; and respectively transferring a first area region or a subregion of a first area region and a second area region or a subregion of a second area region of the decorative layer to a surface to be decorated, the one or more individualizable layers of the respective second area region being individualized before or during the transfer, so that, in addition to one of the optically variable decorative elements, an individualized machine-readable optical marking is transferred from the transfer strip to the surface to be decorated, wherein a relief structure which generates filigree structured optical effects is molded in the replicating layer of the decorative layer in the first area region and/or in that a relief structure which generates continuous color gradations or a two-dimension color change, is molded in the replicating coating layer in the second area region.

28. A method for decorating outer packagings, the method comprising:

providing a transfer strip comprising a strip-like backing film, a decorative layer and a release layer arranged between the decorative layer and the backing film, the decorative layer having a multiplicity of identical optically variable decorative elements, which are arranged in first area regions, which are separate from one another and spaced apart from one another in the longitudinal direction of the transfer strip, and the decorative layer having second area regions, which are separate from one another and spaced apart from one another in the longitudinal direction of the transfer strip and in which the decorative layer has one or more individualizable layers for providing respectively different machine-readable optical markings; and respectively transferring a first area region or a subregion of a first area region and a second area region or a subregion of a second area region of the decorative layer to a surface to be decorated, the one or more individualizable layers of the respective second area region being individualized before or during the transfer, so that, in addition to one of the optically variable decorative elements, an individualized machine-readable optical marking is transferred from the transfer strip to the surface to be decorated, wherein the decorative layer has in the second area regions a replicating layer in the surface of which in each second area region a first relief structure is molded at least in certain regions in one or more first subregions and a second relief structure, which differs from the first relief structure in at least one structure parameter, is molded in one or more second subregions, and wherein the individualizable layers of the respective second area region are individualized both in the first subregions and in the second subregions to provide an individualized machine-readable optical marking which comprises a first part, which can be read under first illuminating conditions and in which one or more first subregions are generated, and a second part, which can be read under second illuminating conditions, which are different from the first illuminating conditions, and in which one or more second subregions are generated.

29. A method for decorating outer packagings, the method comprising:

providing a transfer strip comprising a strip-like backing film, a decorative layer and a release layer arranged between the decorative layer and the backing film, the decorative layer having a multiplicity of identical optically variable decorative elements, which are arranged in first area regions, which are separate from one another and spaced apart from one another in the longitudinal direction of the transfer strip, and the decorative layer having second area regions, which are separate from one another and spaced apart from one another in the longitudinal direction of the transfer strip and in which the decorative layer has one or more individualizable layers for providing respectively different machine-readable optical markings; and respectively transferring a first area region or a subregion of a first area region and a second area region or a subregion of a second area region of the decorative layer to a surface to be decorated, the one or more individualizable layers of the respective second area region being individualized before or during the transfer, so that, in addition to one of the optically variable decorative elements, an individualized machine-readable optical marking is transferred from the transfer strip to the surface to be decorated, wherein the decorative layer has in the first area regions and in the second area regions a replicating layer in the surface of which a relief structure is molded at least in certain regions, wherein, in the region in which in each case a first and a second area region are adjacent one another there is formed a quiet zone, in which no relief structure, matt structure or moth-eye structure is molded in the replicating layer and/or in which one or more of the reflective layers provided in the decorative layer are completely or predominantly not provided or removed, the quiet zones having a width of between 0.1 mm and 5 mm.

30. The method as claimed in claim 29, wherein an adhesive layer is applied to the surface of the decorative layer that is opposite from the release layer over the full surface area at least in the first area regions by means of screen printing or gravure printing, wherein during the transfer, the transfer strip is pressed against the surface to be decorated in a first area region by means of an embossing tool corresponding to the shaping of the decorative element, wherein the transfer strip is pulled off from the surface to be decorated and the decorative element thereby remains on the surface to be decorated and the surrounding regions of the decorative layer remain on the transfer strip and are separated from the decorative element when pulling off takes place.

31. A method for decorating outer packagings, the method comprising:

providing a transfer strip comprising a strip-like backing film, a decorative layer and a release layer arranged between the decorative layer and the backing film, the decorative layer having a multiplicity of identical optically variable decorative elements, which are arranged in first area regions, which are separate from one another and spaced apart from one another in the longitudinal direction of the transfer strip, and the decorative layer having second area regions, which are separate from one another and spaced apart from one another in the longitudinal direction of the transfer strip and in which the decorative layer has one or more individualizable layers for providing respectively different machine-readable optical markings; and respectively transferring a first area region or a subregion of a first area region and a second area region or a subregion of a second area region of the decorative layer to a surface to be decorated, the one or more individualizable layers of the respective second area region being individualized before or during the transfer, so that, in addition to one of the optically variable decorative elements, an individualized machine-readable optical marking is transferred from the transfer strip to the surface to be decorated, wherein the first and second area regions are arranged overlapping and/or nested in one another, the first area regions forming a frame for the second area regions, and the second area regions being arranged entirely or partially within the frame.

32. The method as claimed in claim 31, further comprising an HRI layer at least partially provided in the overlapping region of the first and second area regions.

* * * * *